(12) United States Patent
Yamada

(10) Patent No.: US 10,470,158 B2
(45) Date of Patent: Nov. 5, 2019

(54) COMMUNICATION DEVICE, COMMUNICATION SYSTEM, AND COMMUNICATION METHOD

(71) Applicant: NEC Corporation, Tokyo (JP)

(72) Inventor: Yoshiyuki Yamada, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/563,024

(22) PCT Filed: Mar. 22, 2016

(86) PCT No.: PCT/JP2016/001632
§ 371 (c)(1),
(2) Date: Sep. 29, 2017

(87) PCT Pub. No.: WO2016/157821
PCT Pub. Date: Oct. 6, 2016

(65) Prior Publication Data
US 2018/0288680 A1    Oct. 4, 2018

(30) Foreign Application Priority Data

Mar. 31, 2015  (JP) ................................ 2015-070951

(51) Int. Cl.
*H04W 48/06* (2009.01)
*H04W 68/02* (2009.01)
(Continued)

(52) U.S. Cl.
CPC ....... *H04W 68/02* (2013.01); *H04W 28/0289* (2013.01); *H04W 28/085* (2013.01); *H04W 48/06* (2013.01); *H04W 68/00* (2013.01)

(58) Field of Classification Search
CPC ............. H04W 28/0289; H04W 28/08; H04W 28/085; H04W 48/06; H04W 4/04; H04W 68/00; H04W 68/02
See application file for complete search history.

(56) References Cited

U.S. PATENT DOCUMENTS

2012/0282956 A1* 11/2012 Kim ........................ H04L 51/38
                                                              455/466
2013/0203450 A1*  8/2013 Mochizuki ............ H04W 68/02
                                                              455/458
(Continued)

FOREIGN PATENT DOCUMENTS

JP    2015-002468 A    1/2015
WO    2013/014847 A1   1/2013

OTHER PUBLICATIONS

3GPP TS 23.401, v12.0.0 (Mar. 2013), "3rd Generation Partnership Project; Technical Specification Group Services and System Aspects; General Packet Radio Service (GPRS) enhancements for Evolved Universal Terrestrial Radio Access Network (E-UTRAN) access (Release 12)," Sep. 2013, 290 pages.

(Continued)

*Primary Examiner* — Mewale A Ambaye
(74) *Attorney, Agent, or Firm* — Sughrue Mion, PLLC

(57) ABSTRACT

The objective of the invention is to suppress increases in a C-Plane processing load on a mobile network side even if requests to call a plurality of terminals in the mobile network are generated within a short period of time. A communication device according to one mode of embodiment of the present invention is a communication device which transmits a paging message to a terminal that transmits a control signal for connecting to a network in response to receiving the paging message, wherein the communication device includes: a control unit which, in response to being requested to transmit paging messages to a plurality of (Continued)

terminals, determines, for each of the plurality of terminals, a time period for delaying transmission of the control signal; and a transmitting unit which transmits, to each of the plurality of terminals, the respective paging message including the time period by which the transmission of the control signal is to be delayed.

12 Claims, 37 Drawing Sheets

(51) Int. Cl.
    *H04W 68/00*     (2009.01)
    *H04W 28/02*     (2009.01)
    *H04W 28/08*     (2009.01)

(56) References Cited

U.S. PATENT DOCUMENTS

| 2014/0153530 | A1 | | 6/2014 | Iwai et al. | |
|---|---|---|---|---|---|
| 2015/0230276 | A1 | * | 8/2015 | Jung | H04W 72/06 |
| | | | | | 370/229 |

OTHER PUBLICATIONS

HTC, Altering MTC devices' authorized time periods for signaling congestion/overload control, 3GPP TSG SA WG2 Meeting #79E (Electronic) TD S2-103182, Jun. 29, 2010, passage 6.21.2, pp. 1-5.
Written Opinion of the International Searching Authority of PCT/JP2016/001632 dated May 17, 2016.
International Search Report of PCT/JP2016/001632 dated May 17, 2016.

\* cited by examiner

TIMING PARAMETER FIELD A1

Paging C

CLASS DESIGNATION FIELD C1

Paging c

CLASS DESIGNATION FIELD c1

TERMINAL ATTRIBUTE FIELD F1
(FIELD IN WHICH INSTRUCTION TO SET
delayTolerantAccess FLAG IS INCLUDED)

TERMINAL ATTRIBUTE FIELD f1
(FIELD IN WHICH INSTRUCTION TO SET
delayTolerantAccess FLAG IS INCLUDED)

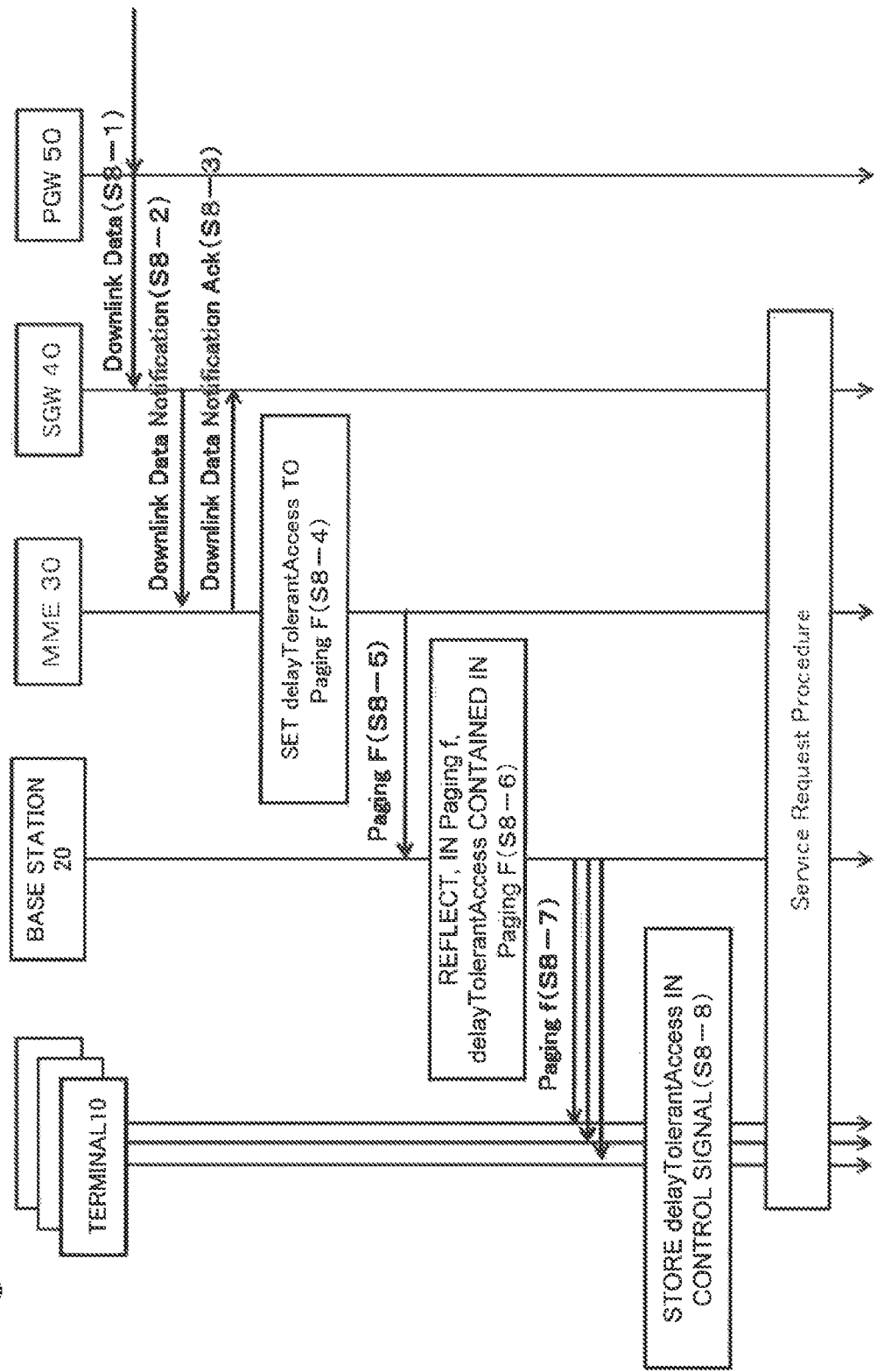

COMMUNICATION DEVICE, COMMUNICATION SYSTEM, AND COMMUNICATION METHOD

CROSS REFERENCE TO RELATED APPLICATIONS

This application is a National Stage of International Application No. PCT/JP2016/001632 filed Mar. 22, 2016, claiming priority based on Japanese Patent Application No. 2015-070951 filed Mar. 31, 2015, the contents of all of which are incorporated herein by reference in their entirety.

TECHNICAL FIELD

The present invention relates to a communication device, a communication system, and a communication method.

BACKGROUND ART

NPL 1 discloses a technology for calling a terminal in a mobile network. In NPL 1, in order to call a terminal in a mobile network, a mobility management entity (MME) transmits a paging message to the terminal. In response to receiving the paging message, the terminal 1 transmits a control signal ("Service Request") to the MME.

CITATION LIST

Patent Literature

PTL 1: International Application Publication No. WO 2013/014847
PTL 2: Japanese Unexamined Patent Application Publication No. 2015-002468

Non Patent Literature

NPL 1: 3GPP TS 23.401 v12.0.0 (2013-03) "3rd Generation Partnership Project; Technical Specification Group Services and System Aspects; General Packet Radio Service (GPRS) enhancements for Evolved Universal Terrestrial Radio Access Network (E-UTRAN) access (Release 12)," September, 2013

SUMMARY OF INVENTION

Technical Problem

Communication traffic has been rapidly increasing in recent years due to spread of smartphones, smart devices, and the like. Further, it is assumed that a number of terminals will increase in the future due to spread of Machine to Machine (M2M) communication and Internet of Things (IoT) services, and communication traffic may further increase.

In such MTC communication and IoT, for example, it is assumed that a request for calling a plurality of terminals in a mobile network is generated from outside of the mobile network within a short period of time, and an MME simultaneously transmits paging messages to the plurality of terminals in response to the request. In this case, in the technology described in NPL 1, the respective plurality of terminals simultaneously transmit control signals ("Service Requests") to the MME in response to receiving the paging messages. Consequently, the MME is required to process control signals from the plurality of terminals within a short period of time, and a C-plane processing load on the MME increases.

An object of the present invention is to provide a communication device and the like that are able to solve the aforementioned problem and, even when a request for calling a plurality of terminals in a mobile network within a short period of time is generated, suppress increase in a C-plane processing load on the mobile network side.

Solution to Problem

A communication device according to an aspect of the present invention is a communication device transmitting a paging message to a terminal that, in response to receiving the paging message, transmits a control signal for connecting to a network, and the communication device comprises: control means that, in response to being requested to transmit a paging message to a plurality of terminals, determines a time by which transmission of the control signal is delayed, for each of the plurality of terminals; and transmitting means that transmits a paging message including a time by which transmission of the control signal is delayed, to each of the plurality of terminals.

A communication system according to an aspect of the present invention comprises: a plurality of terminals transmitting a control signal for connecting to a network, in response to receiving a paging message; and a communication device that, in response to being requested to transmit a paging message to the plurality of terminals, is able to transmit, to each of the plurality of terminals, a paging message including a time by which transmission of the control signal is delayed, wherein the communication device determines a time by which transmission of the control signal is delayed, for each of the plurality of terminals.

A communication method according to an aspect of the present invention is a communication method in a communication device transmitting a paging message to a terminal that, in response to receiving the paging message, transmits a control signal for connecting to a network, and the communication method comprises: a first step of determining a time by which transmission of the control signal is delayed, in response to being requested to transmit a paging message to a plurality of terminals, for each of the terminals; and a second step of transmitting a paging message including a time by which transmission of the control signal is delayed, to each of the plurality of terminals.

Advantageous Effect of Invention

The communication device and the like according to the present invention are able to suppress increase in a C-plane processing load on a mobile network side, even when a request for calling a plurality of terminals in the mobile network within a short period of time is generated.

BRIEF DESCRIPTION OF DRAWINGS

FIG. 42 is a sequence diagram illustrating an operation example of a communication system according to the eighth example embodiment.

DESCRIPTION OF EMBODIMENTS

First Example Embodiment

Figure 1:
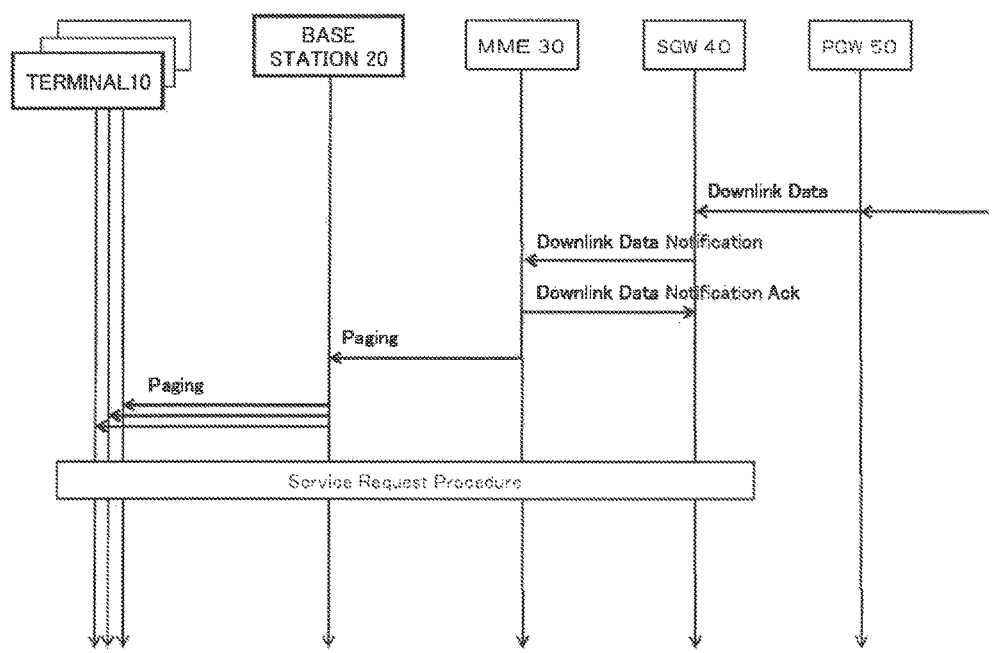
FIG. 1 is an operation example of a communication system in a "Network Triggered Service Request" described in Section 5.3.4.3 in the 3rd Generation Partnership Project (3GPP) specifications (TS23.401 v12.0.0).

Referring to drawings, a first example embodiment of the present invention will be described. Reference signs given to the overview are given to each component for convenience as examples to facilitate understanding, and the description of the overview is not intended for any limitation.

"Paging" in the "Network Triggered Service Request" described in Section 5.3.4.3 in the 3rd Generation Partnership Project (3GPP) specifications (TS23.401 v12.0.0) does not include information designating a timing for a terminal 10 to start a "Service Request Procedure." Note that "Paging" is a control signal used for calling a terminal 10 existing in a mobile network from outside the mobile network (e.g. data packet network).

Consequently, when transmitting "Pagings" to a plurality of terminals 10 within a short period of time, an MME 30 receives succeeding control signals ("Service Requests") from the plurality of terminals 10 within a short period of time. Accordingly, the MME 30 is required to process the control signals ("Service Requests") from the plurality of terminals 10 within a short period of time, and a load on the MME 30 increases. In other words, when a large number of "Paging s" are generated within a short period of time, that is, when "Pagings" are generated in a bursty manner, succeeding control signals ("Service Requests") also form bursty traffic, and a load on the MME 30 greatly increases.

Accordingly, in a communication system according to the first example embodiment, by adding timing information about transmission of a control signal ("Service Request") into a "Paging" signal transmitted by the MME 30, for each of the plurality of terminals 10, timings at which the MME 30 receives control signals ("Service Requests") are dispersed, and load increase on the MME 30 is suppressed.

Accordingly, when transmission of paging messages to a plurality of terminals is requested, the MME 30 or a base station 20 in the communication system according to the first example embodiment determines a time by which transmission of a control signal ("Service Request") is delayed (delay time) for each of the plurality of terminals, and stores a delay time determined for each of the plurality of terminals into a paging message transmitted to each of the plurality of terminals. Accordingly, in paging messages received by the respective plurality of terminals, for example, different delay times are stored for the respective plurality of terminals, and times at which the plurality of terminals transmit control signals can be dispersed. Note that not all the delay times determined by the MME 30 or the base station 20 for the respective plurality of terminals are required to be different from one another, and, for example, part of the delay times may overlap one another as long as the delay times are dispersed as a whole.

WO 2013/014847 describes storing information such as a timing in a paging message.

In response to being requested to transmit paging messages to a plurality of terminals, the MME 30 or the base station 20 in the communication system according to the first example embodiment determines, for each terminal, a time by which transmission of a control signal is delayed, and transmits a paging message including a time by which transmission of the control signal is delayed to each of the plurality of terminals. The MME 30 or the base station 20 stores information about a time (timing) at which a terminal 10 transmits a control signal into a "Paging." For example, the MME 30 or the base station 20 stores information designating a time (timing) at which a terminal 10 starts a "Service Request Procedure" into a "Paging." For example, the terminal 10 starts a "Service Request Procedure," based on the information designating a time (timing), the information being included in the "Paging."

Consequently, for example, by changing a timing at which a control signal ("Service Request") is transmitted to the MME 30 for each of a plurality of terminals 10, the communication system according to the first example embodiment is able to disperse timings at which the MME 30 receives control signals ("Service Requests"). Accordingly, for example, even when transmitting a large number of "Pagings" within a short period of time, the MME 30 is able to disperse timings at which control signals ("Service Requests") from the plurality of terminals 10 are received, and therefore is able to suppress rapid increase in a load on the MME 30.

FIG. 1 illustrates an operation example of a communication system in the "Network Triggered Service Request" described in Section 5.3.4.3 in the 3rd Generation Partnership Project (3GPP) specifications (TS23.401 v12.0.0).

As illustrated in FIG. 1, a packet data network gateway (P-GW) 50 transfers received communication data to a serving gateway (S-GW) 40. In response to receiving the communication data, the S-GW 40 notifies a "Down Link Notification" to an MME 30.

In response to the "Down Link Notification," the MME 30 notifies a "Down Link Notification Acknowledgement (Ack)" to the S-GW 40.

In response to receiving the "Down Link Notification," the MME 30 transmits a "Paging [S1 Application Protocol (S1AP)]" to a base station 20.

In response to receiving the "Paging (S1AP)" from the MME 30, the base station 20 notifies a "Paging [Radio Resource Control (RRC)]" to a terminal 10.

In response to receiving the "Paging (RRC)," the terminal 10 starts an establishment procedure of an EPS bearer (a "Service Request Procedure" in S1-6).

By the start of the establishment procedure of an evolved packet system (EPS) bearer by the terminal 10, control signals are exchanged between the terminal 10, the base station 20, the MME 30, the S-GW 40, and the P-GW 50. By control signals being exchanged between the respective nodes, an EPS bearer is established. The terminal 10 communicates through the established EPS bearer.

Figure 2:
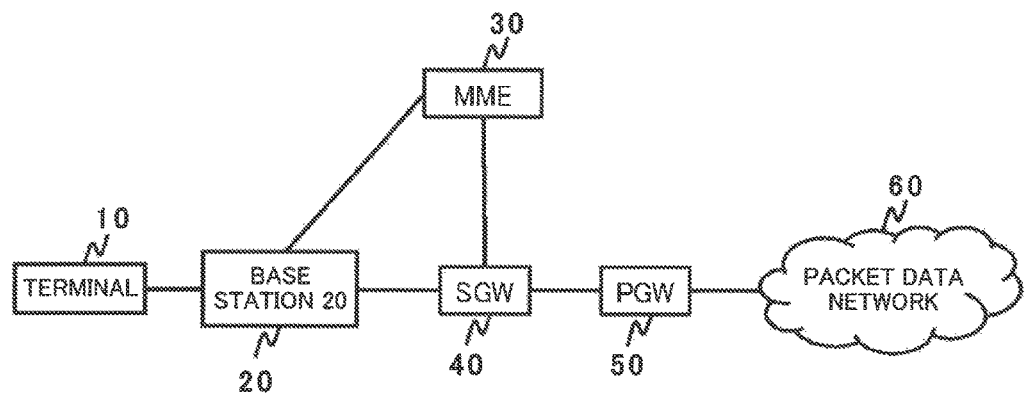
FIG. 2 is a configuration example of a communication system according to a first example embodiment.

FIG. 2 is a configuration example of the communication system according to the first example embodiment. While FIG. 2 exemplifies a long term evolution (LTE)-based communication system, the communication system according to the present invention is not limited to the example in FIG. 2.

In the example in FIG. 2, the communication system according to the first example embodiment includes a terminal 10, a base station 20, an MME 30, an S-GW 40, a P-GW 50, and a packet data network 60.

The terminal 10 [user equipment (UE)] is connected to the base station 20 and accesses the packet data network such as the Internet through a core network. For example, the core network is composed of the MME 30, the S-GW 40, and the P-GW 50.

The terminal 10 includes a mobile phone, a personal computer (PC), a mobile router, a smart device (e.g. a smart meter monitoring power consumption at home, a smart television, and a wearable terminal), and a machine-to-machine (M2M) device. For example, the M2M device includes industrial equipment, an automobile, healthcare equipment, and consumer electronics in addition to the aforementioned devices.

Network nodes such as the base station 20, the MME 30, the S-GW 40, and the P-GW 50 perform various types of signal processing related to communication services provided by the communication system. For example, the MME 30 performs signal processing related to mobility management of the terminal 1.

For example, the base station 20 has a function (user plane function) of performing data communication with the terminal 10 in accordance with the packet data convergence protocol (PDCP). Further, the base station 20 has a function (C-plane function) of processing control signaling.

For example, the MME 30 includes a function (C-plane function) of processing control signaling such as control of setup, release, and a handover of a communication session, and a function of managing subscriber information in the communication system in coordination with a home subscriber server (HSS).

For example, the S-GW 40 includes a function (user plane function) of processing a packet and a function (C-plane function) of processing control signaling.

For example, the P-GW 50 includes a function (user plane function) of processing a packet, a function [policy and charging enforcement function (PCEF)] of managing a charging state depending on communication, a function [policy and charging rule function (PCRF)] of controlling a policy such as QoS, and a lawful interception (LI) function of intercepting communication.

Figure 3:
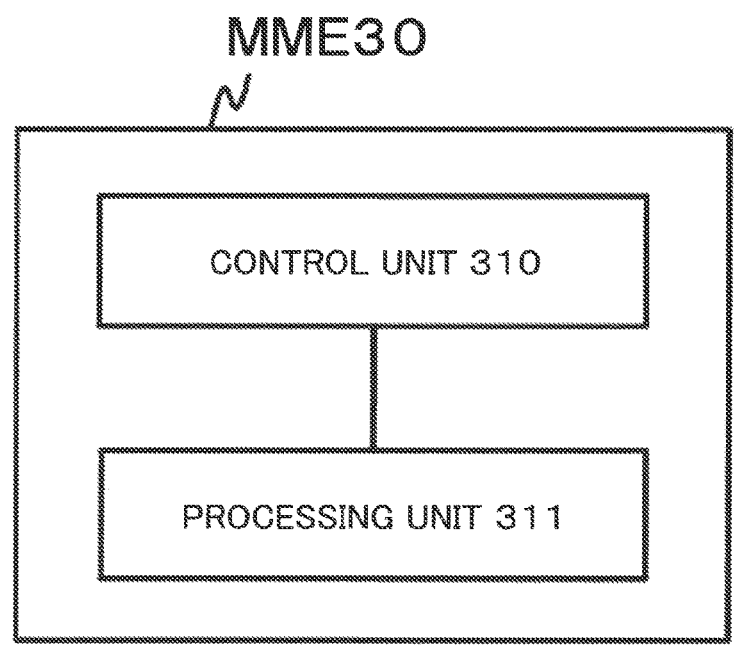
FIG. 3 is a configuration example of a mobility management entity (MME) 30 according to the first example embodiment.

FIG. 3 illustrates a configuration example of the MME 30 according to the first example embodiment. As exemplified in FIG. 3, the MME 30 includes a control unit 310 and a processing unit 311.

The control unit 310 has a function equivalent to a C-plane. The control unit 310 has a function of processing control signaling such as control of setup, release, and a handover of a communication session. The control unit 310 transmits and receives control signaling through the processing unit 311.

The control unit 310 has a function of setting information about a time (timing) to a predetermined field in a paging message ["Paging (S1AP)"]. For example, the information about a time (timing) is information about a time (timing) by which the terminal 10 delays transmission of a control signal. For example, the information about a time (timing) is information about a time (timing) by which the terminal 10 delays a start of a "Service Request Procedure." For example, the information about a time (timing) is information about a time (timing) at which the terminal 10 transmits a "Service Request."

For example, in response to being requested to transmit paging messages to a plurality of terminals, the control unit 310 determines a time by which transmission of a control signal is delayed for each of the plurality of terminals. For example, the control unit 310 determines a time by which transmission of a control signal is delayed for each of the plurality of terminals, in accordance with a predetermined policy or a predetermined algorithm. For example, the control unit 310 may determine a time by which transmission of a control signal is delayed for each of the plurality of terminals, depending on load status of the MME 30.

Figure 4:
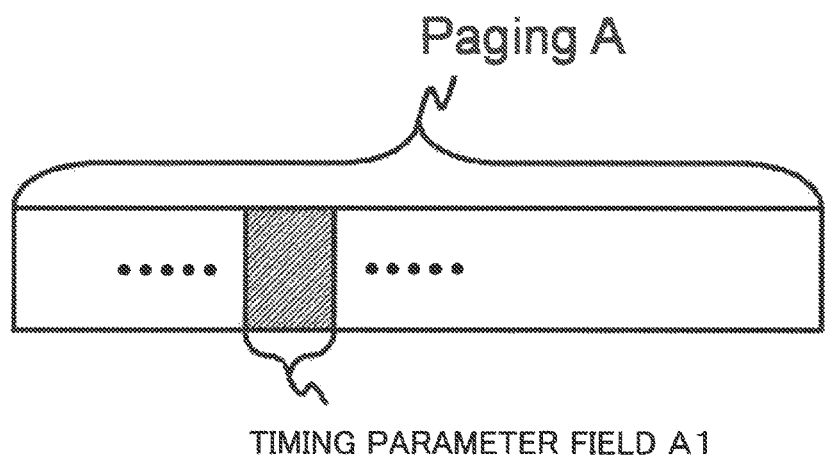
FIG. 4 is a format example of a paging message ["Paging (S1AP)"] according to the first example embodiment.

FIG. 4 illustrates a format example of a paging message ["Paging A (S1AP)"]. As exemplified in FIG. 4, the paging message ["Paging A (S1AP)"] includes a timing parameter field A1. The timing parameter field A1 is a predetermined field to which the control unit 310 sets information about a transmission timing (a time by which transmission of a control signal is delayed) of a control signal. For example, the timing parameter field A1 is set in a predetermined position in a control signal being the paging message. For example, the position in which the timing parameter field A1 is set may be a header part of the paging message or a payload part of the paging message. The position in which the timing parameter field A1 is set is not limited to the above, and may be any position.

The processing unit 311 transmits a paging message to the base station 20.

Figure 5:
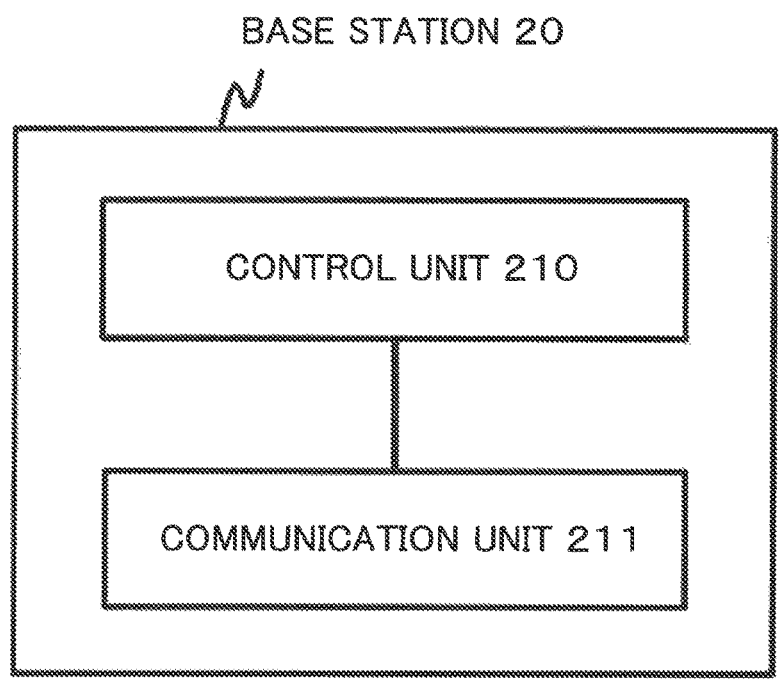
FIG. 5 is a configuration example of a base station 20 according to the first example embodiment.

FIG. 5 is a configuration example of the base station 20 according to the first example embodiment. As exemplified in FIG. 5, the base station 20 includes a control unit 210 and a communication unit 211.

The control unit 210 has a function equivalent to a so-called C-plane. The C-plane has a function of processing a control signal transmitted in the communication system.

The control unit 210 has a function of setting information about a time (timing) to a predetermined field in a paging message ["Paging (RRC)"] transmitted to the terminal 10. For example, the information about a time (timing) is information about a time (timing) by which the terminal 10 delays a start of a "Service Request Procedure." For example, the information about a time (timing) is information about a time (timing) by which the terminal 10 delays transmission of a predetermined control signal. For example, the information about a time (timing) is information about a time (timing) by which the terminal 10 delays transmission of a "Service Request."

For example, the control unit 210 sets information about a time (timing) to a predetermined field in a paging message ["Paging (RRC)"] transmitted to the terminal 10, based on information about a time (timing), the information being included in a paging message ["Paging (S1AP)"] received from the MME 30. For example, the control unit 210 may read information about a time (timing), the information being included in a paging message ["Paging (S1AP)"] received from the MME 30, and map (reflect) the read information about a time (timing) onto (in) a predetermined field in a paging message ["Paging (RRC)"] transmitted to the terminal 10.

Figure 6:
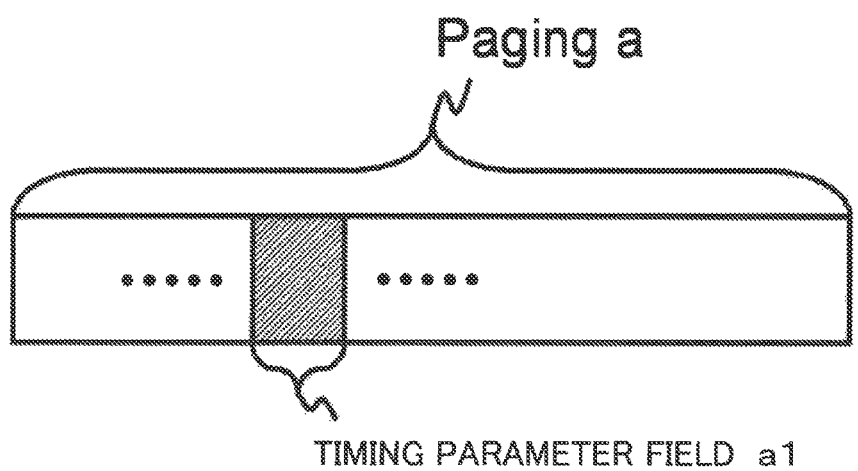
FIG. 6 is a format example of a paging message ["Paging (RRC)"] according to the first example embodiment.

FIG. 6 illustrates a format example of the paging message ["Paging (RRC)"]. As exemplified in FIG. 6, the paging message ["Paging (RRC)"] includes a timing parameter field a1. The timing parameter field a1 is a predetermined field to which the control unit 210 sets information about a time (timing). For example, the timing parameter field a1 is set in a predetermined position in a control signal being the paging message. For example, the position in which the timing parameter field a1 is set may be a header part of the paging message or a payload part of the paging message. The position in which the timing parameter field a1 is set is not limited to the above, and may be any position.

For example, the control unit 210 may store information about a timing, the information being included in the paging message ["Paging (S1AP)"] received from the MME 30, into a predetermined field in a paging message ["Paging (RRC)"] transmitted to the terminal 10.

The communication unit 211 has a function equivalent to a so-called user plane. The user plane has a function of processing data transmitted in the communication system.

Figure 7:
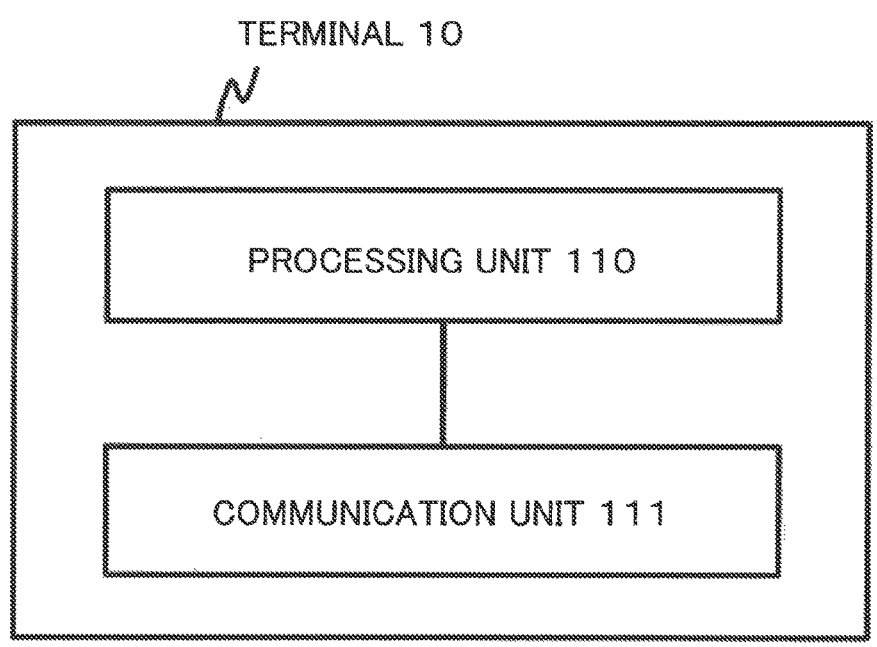
FIG. 7 is a configuration example of a terminal 10 according to the first example embodiment.

FIG. 7 illustrates a configuration example of the terminal according to the first example embodiment. As exemplified in FIG. 7, for example, the terminal 10 includes a processing unit 110 and a communication unit 111. The processing unit 110 receives a message sent from the base station 20 to the terminal 10 and generates a message notified to the base station 20 by the terminal 10. The communication unit 111 receives any message from the base station 20 and transmits a generated message to the base station 20.

The processing unit 110 delays a time (timing) at which a predetermined control signal is transmitted, based on information about a time (timing), the information being included in a paging message ["Paging (RRC)"] received from the base station 20. For example, the processing unit 110 delays a time (timing) at which a "Service Request Procedure" is started. For example, the processing unit 110 delays a time (timing) at which a "Service Request" is transmitted.

For example, the processing unit 110 reads information about a time (timing), the information being included in a paging message ["Paging (RRC)"] received from the base station 20, and delays generation of a "Service Request" by the read time (timing).

The communication unit 111 may delay a time (timing) at which a control signal (e.g. "Service Request") is transmitted.

Figure 8:
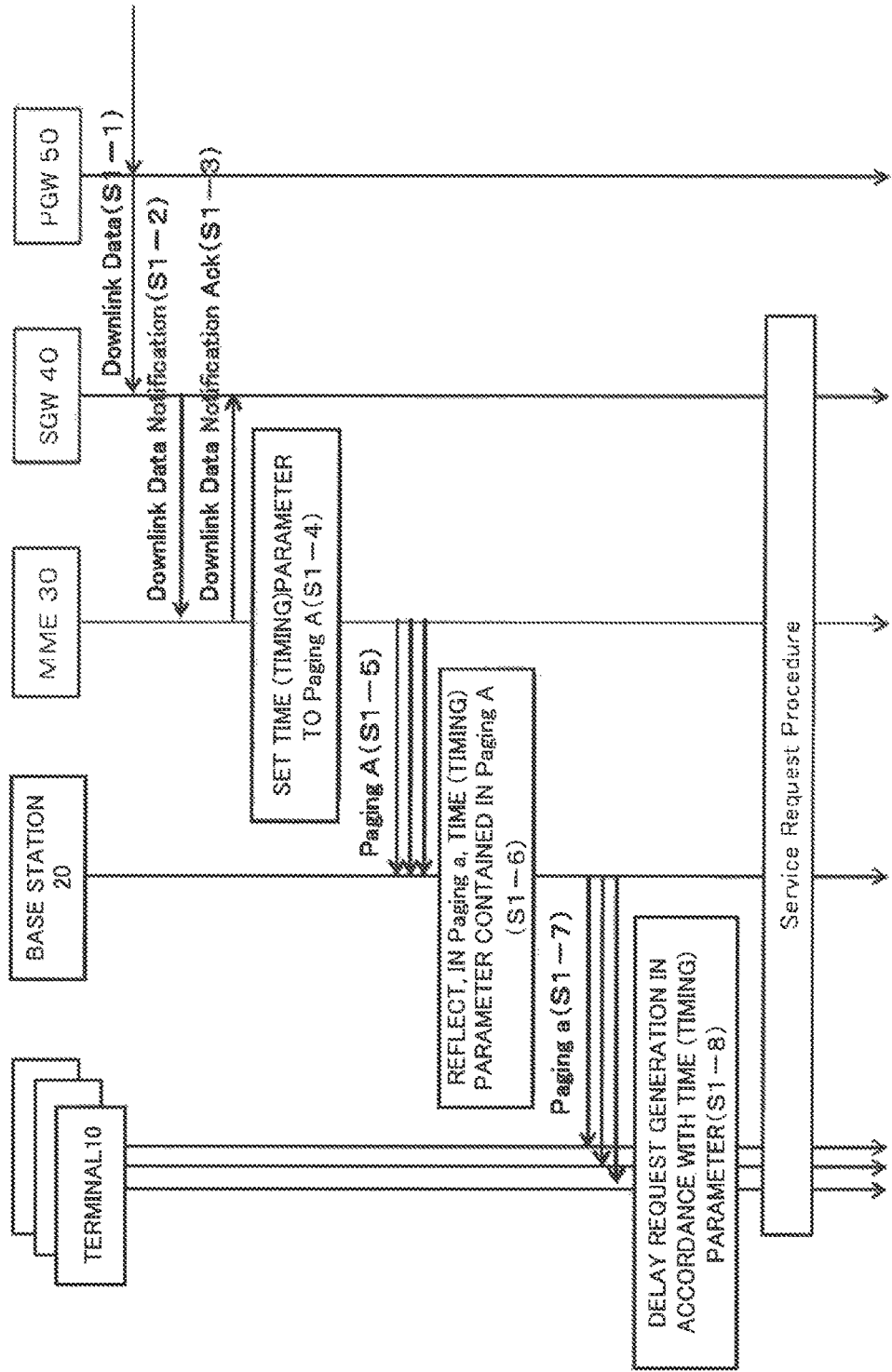
FIG. 8 is a sequence diagram illustrating an operation example of the communication system according to the first example embodiment.

FIG. 8 is a sequence diagram illustrating an operation example of the communication system according to the first example embodiment. FIG. 8 illustrates an operation example of applying the technology according to the present invention to the "Network Triggered Service Request" described in Section 5.3.4.3 in the 3GPP specifications (TS23.401 v12.0.0).

The P-GW 50 transfers a received "Downlink Data" to the S-GW 40 (S1-1).

In response to receiving the "Downlink Data," the S-GW 40 transmits a "Downlink Data Notification" to the MME 30 (S1-2).

In response to receiving the "Downlink Data Notification," the control unit 310 in the MME 30 transmits a "Downlink Data Notification Acknowledgement (Ack)" to the S-GW 40 (S1-3).

In response to receiving the "Downlink Data Notification," the control unit 310 in the MME 30 determines a time by which transmission of a control signal is delayed, for each of a plurality of terminals 10, sets the time (timing parameter) determined for each of the plurality of terminals to a timing parameter field A1 in a "Paging A" transmitted to each of the plurality of terminals (S1-4), and transmits the "Paging A" to the base station 20 (S1-5). The "Paging A" is a paging message over the S1AP ["Paging (S1AP)"].

In response to receiving the "Paging A," the control unit 210 in the base station 20 reflects (maps) the timing parameter in the timing parameter field A1 to (onto) a timing parameter field a1 in a "Paging a" (S1-6). The "Paging a" is a paging message over the RRC protocol ["Paging (RRC)"].

The communication unit 211 in the base station 20 transmits the "Paging a" to each of the plurality of terminals 10 (S1-7). The communication unit 211 may transmit the "Paging a" to the plurality of terminals 10.

For example, when the "Paging a" received from the base station 20 is addressed to a terminal 10, the processing unit 110 in the terminal 10 delays a time (timing) at which a control signal is transmitted, based on information about the time (timing), the information being included in the "Paging a" (S1-8).

As described above, when requested to transmit paging messages to a plurality of terminals, the communication system according to the first example embodiment determines a time (delay time) by which transmission of a control signal ("Service Request") is delayed, for each of the plurality of terminals, and stores the delay time determined for each of the plurality of terminals into a paging message transmitted to each of the plurality of terminals.

Accordingly, for example, the paging messages received by the respective plurality of terminals store different delay times for each of the plurality of terminals, and times at which the plurality of terminals transmit control signals can be dispersed. As described above, delay times determined for each of a plurality of terminals by the MME 30 or the base station 20 are not required to be different from one another, and, for example, part of delay times may overlap one another as long as the times are dispersed as a whole.

Second Example Embodiment

A second example embodiment of the present invention is an example embodiment in a case that an MME 30 or a base station 20 randomly determines a time by which transmission of a control signal is delayed, from a predetermined time range for each of a plurality of terminals. The technology according to the second example embodiment is applicable to any one of the first example embodiment and example embodiments to be described later.

A communication system according to the second example embodiment is similar to the communication system according to the first example embodiment exemplified in FIG. 2, and therefore detailed description thereof is omitted.

Figure 9:
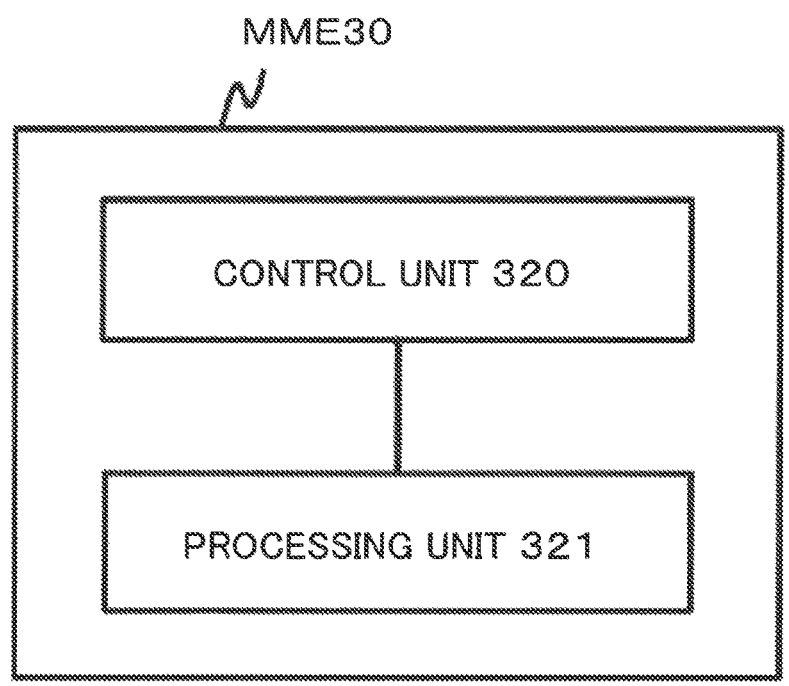
FIG. 9 is a configuration example of an MME 30 according to a second example embodiment.

FIG. 9 is a configuration example of the MME 30 according to the second example embodiment. As illustrated in FIG. 9, the MME 30 includes a control unit 320 and a processing unit 321. A configuration of the processing unit 321 is similar to that of the processing unit 311 in the MME 30 exemplified in FIG. 3, and therefore detailed description thereof is omitted.

For example, the control unit 320 determines a time (value) randomly selected from a plurality of predetermined candidates of delay times to be a delay time for each of a plurality of terminals 10.

For example, the control unit 320 may include a random number generator, calculate a time (value), based on a number generated by the random number generator, and determine the time to be a delay time for each of the plurality of terminals 10. For example, the control unit 320 may define a range of values that can be taken in a predetermined time range and then calculate a time (value) within the range of values that can be taken, based on a number generated by the random number generator, and determine the time to be a delay time for each of the plurality of terminals 10.

For example, the control unit 320 may randomly determine the time for each of the plurality of terminals from a time range determined by an upper limit and a lower limit of a time by which transmission of a control signal is delayed. The upper limit and the lower limit of the time by which transmission of the control signal is delayed may be predetermined or may be notified by another device (unillustrated) requesting transmission of a paging message.

For example, the control unit 320 has a function of setting a determined time (delay time) to a predetermined field in a paging message ["Paging B (S1AP)"]. For example, the control unit 320 sets a delay time (value) by which transmission of a control signal ("Service Request") is delayed for each of the plurality of terminals 10 to a predetermined field in a paging message ["Paging (S1AP)"].

Figure 10:
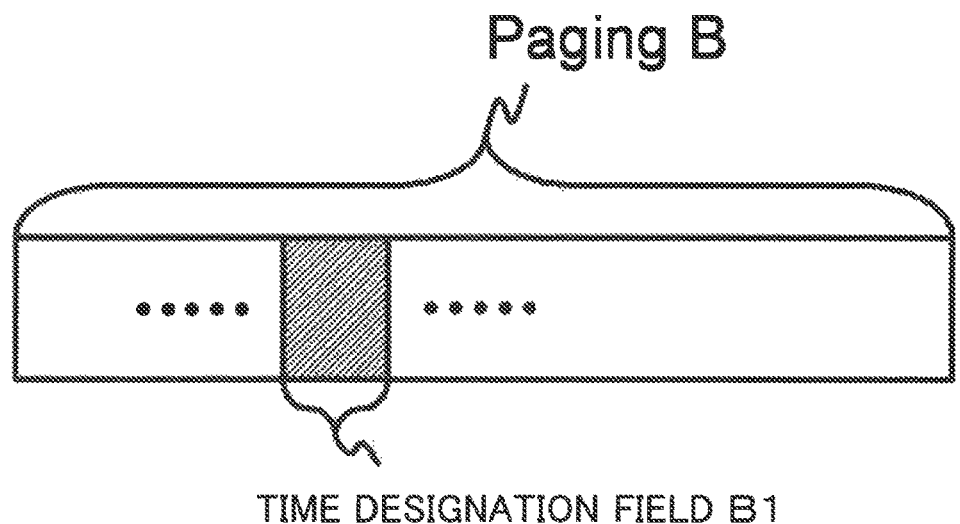
FIG. 10 is a format example of a paging message ["Paging (S1AP)"] according to the second example embodiment.

FIG. 10 illustrates a format example of the paging message ["Paging B (S1AP)"]. As exemplified in FIG. 10, the "Paging B" includes a time designation field B1. The time designation field B1 is a predetermined field to which the control unit 320 sets a delay time (value) for transmission of a control signal ("Service Request") by the terminal 10. For example, the time designation field B1 includes a time (value) by which the terminal 10 delays transmission of a control signal ("Service Request"). For example, the time designation field B1 is set in a predetermined position in the "Paging B." For example, the time designation field B1 may be a header part of the "Paging B" or a payload part of the "Paging B." The position in which the time designation field B1 is set is not limited to the above, and may be any position.

Figure 11:
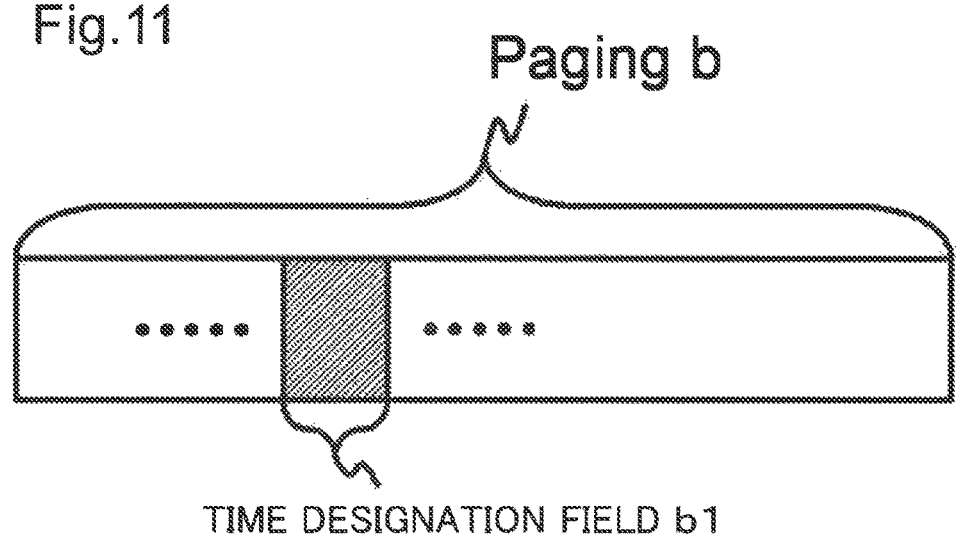
FIG. 11 is a format example of a paging message ["Paging (RRC)"] according to the second example embodiment.

FIG. 11 illustrates a format example of a paging message ["Paging b (RRC)"]. The "Paging b" is a paging message over the RRC transmitted to the terminal 10 by a control unit 210 in the base station 20. As illustrated in FIG. 11, the "Paging b" includes a time designation field b1. The time designation field b1 is a predetermined field to which a delay time (value) for transmission of a control signal ("Service Request") by the terminal 10 is set. For example, the time designation field b1 includes a time (value) by which the terminal 10 delays transmission of a control signal ("Service Request"). For example, the time designation field b1 is set in a predetermined position in the "Paging b." For example, the time designation field b1 may be a header part of the "Paging b" or a payload part of the "Paging b." The position in which the time designation field b1 is set is not limited to the above, and may be any position.

Figure 12:
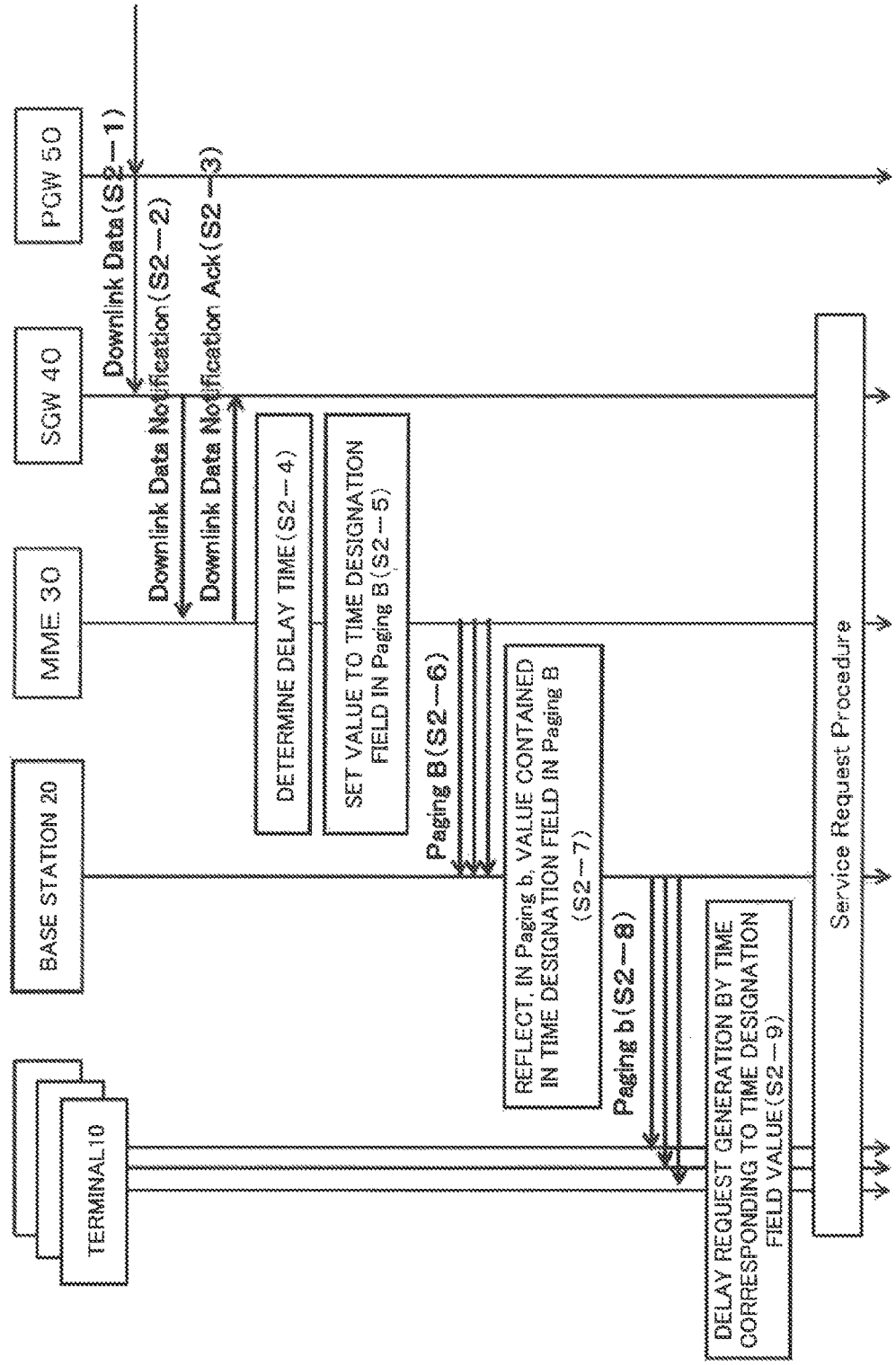
FIG. 12 is a sequence diagram illustrating an operation example of a communication system according to the second example embodiment.

FIG. 12 is a sequence diagram illustrating an operation example of the communication system according to the second example embodiment. S2-1 to S2-3 in FIG. 12 are similar to S1-1 to S1-3 in the operation example according to the first example embodiment illustrated in FIG. 8, and therefore detailed description thereof is omitted.

In response to receiving a "Downlink Data Notification," for example, the control unit 320 in the MME 30 determines a time by which transmission of a control signal is delayed, for each of a plurality of terminals 10 (S2-4).

The control unit 320 sets a delay time determined for each of the plurality of terminals to a time designation field B1 in a "Paging B" transmitted to each of the plurality of terminals (S2-5), and transmits the "Paging B" to the base station 20 through the processing unit 321 (S2-6). The "Paging B" is a paging message over the S1AP ["Paging (S1AP)"].

In response to receiving the "Paging B," the control unit 210 in the base station 20 sets a value to a time designation field b1 in a "Paging b," based on a delay time set in the time designation field B1 in the "Paging B" (S2-7). The "Paging b" is a paging message on the RRC ["Paging (RRC)"].

A communication unit 211 in the base station 20 transmits a "Paging b" to each of the plurality of terminals 10 (S2-8).

A processing unit 100 in the terminal 10 reads the value set in the time designation field b1 in the paging message ["Paging (RRC)"] received from the base station 20, and delays generation of a "Service Request" by the read time (S2-9). For example, based on the delay time included in the "Paging b" received from the base station 20, the processing unit 100 delays transmission of a control signal ("Service Request") by the delay time.

As described above, in the communication system according to the second example embodiment, the MME 30 or the base station 20 randomly determines a time by which transmission of a control signal is delayed, for each of a plurality of terminals, from a predetermined time range. Accordingly, for example, by changing a timing at which a predetermined control signal ("Service Request") is transmitted for each of the plurality of terminals 10, the communication system is able to disperse timings at which the MME 30 receives control signals ("Service Requests"). Accordingly, for example, even when transmitting a plurality of "Pagings" within a short period of time, the MME 30 is able to disperse reception timings of predetermined control signals ("Service Requests") from the terminals 10, and therefore is able to suppress increase in a load on the MME 30.

Third Example Embodiment

A third example embodiment of the present invention is an example embodiment in a case that a service class of a terminal 10 is set to a paging message. The technology according to the third example embodiment is applicable to any one of the first or second example embodiments, and example embodiments to be described later.

The service class is a pointer indicating information about a time (timing). For example, similarly to the first and second example embodiments, the information about a time (timing) is information about a time (timing) by which the terminal 10 delays transmission of a control signal. For example, the information about a time (timing) is information about a time (timing) by which the terminal 10 delays a start of a "Service Request Procedure." For example, the information about a time (timing) is information about a time (timing) at which the terminal 10 transmits a "Service Request." For example, the service class may be a symbol/numerical value indicating priority of the communication, or may be a symbol/numerical value determining a range of a delay time that can be taken.

For example, according to the third example embodiment, the terminal 10 stores a service class and information about a time (timing) in an associated manner, and delays transmission of a control signal ("Service Request"), based on information about a time (timing) related to a service class designated by an MME 30 (a service class included in a paging message). According to the third example embodiment, by setting a service class to a paging message, an information amount stored in the paging message can be reduced.

The communication system according to the third example embodiment is similar to the communication system according to the first example embodiment illustrated in FIG. 2, and therefore detailed description thereof is omitted. A case that information about a time (timing) associated with a service class is a time [delay time (value) of the terminal 10] by which the terminal 10 delays transmission of a control signal will be hereinafter described as an example.

Figure 13:
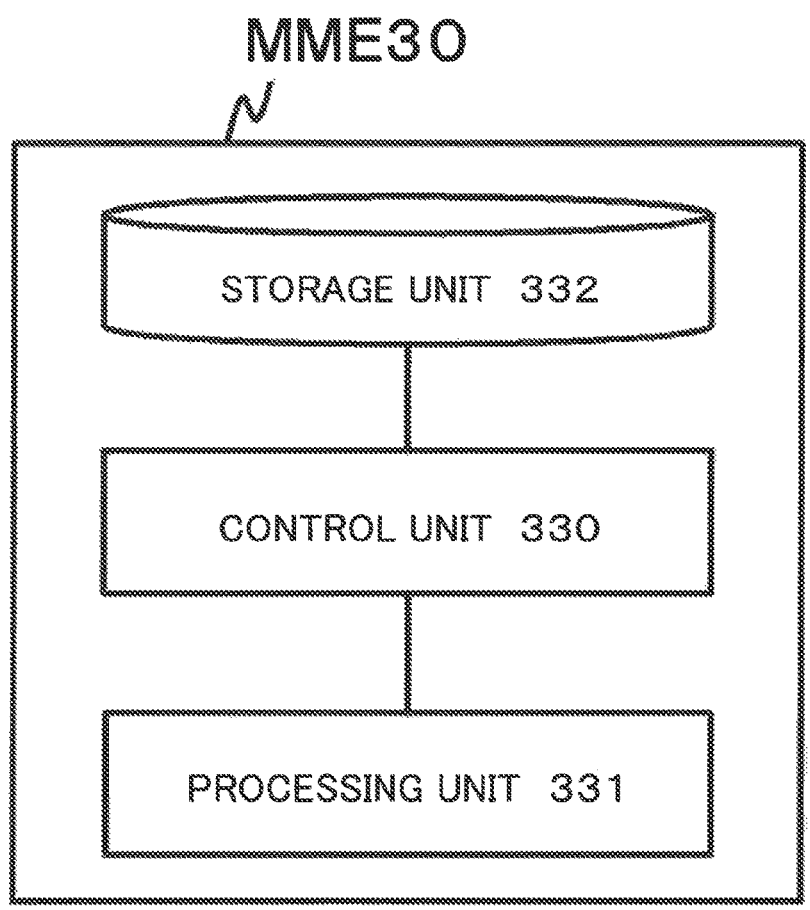
FIG. 13 is a configuration example of an MME 30 according to a third example embodiment.

FIG. 13 is a configuration example of the MME 30 according to the third example embodiment. As exemplified in FIG. 13, the MME 30 includes a processing unit 331, a control unit 330, and a storage unit 332. The processing unit 331 has a configuration similar to that of the processing unit 311 in the MME 30 according to the first example embodiment exemplified in FIG. 3, and therefore detailed description thereof is omitted.

For example, the control unit 330 has a function of determining information about a time (value) at which the terminal 10 transmits a control signal ("Service Request"). For example, the control unit 330 determines a time [delay time (value) of the terminal 10] by which the terminal 10 delays transmission of a control signal.

Based on a determined delay time of the terminal 10, the control unit 330 refers to the storage unit 332 and determines a service class set to a paging message. The storage unit 332 stores a delay time of the terminal 10 and a service class in an associated manner. The control unit 330 refers to the storage unit 332, searches for a service class related to the determined delay time of the terminal 10, and sets a service class obtained as a result of the search to a paging message.

Figure 14:
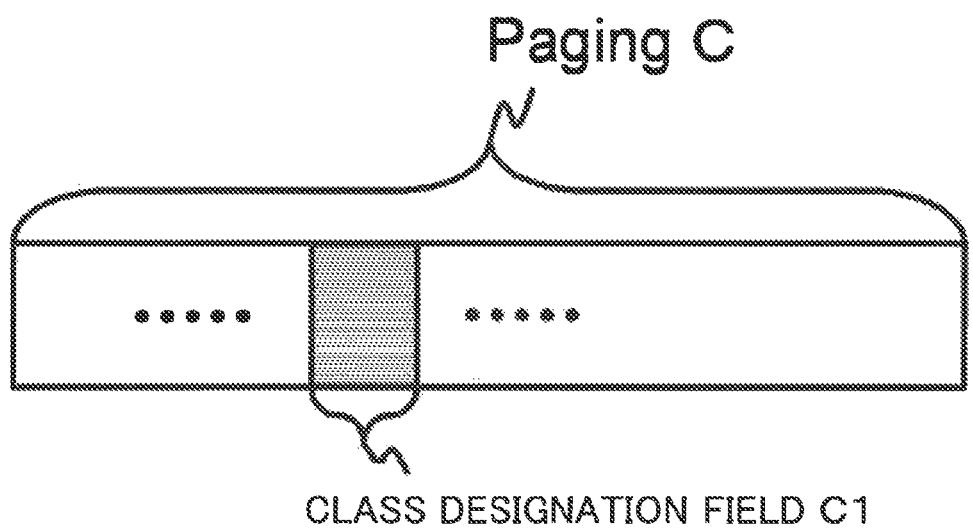
FIG. 14 is a format example of a paging message ["Paging (S1AP)"] according to the third example embodiment.

FIG. 14 illustrates a format example of a paging message ["Paging C (S1AP)"] according to the third example embodiment. As exemplified in FIG. 14, the "Paging C (S1AP)" includes a class designation field C1. The class designation field C1 is a field to which a service class related to a delay time determined by the control unit 330 is set.

For example, the class designation field C1 is set in a predetermined position in a message in the "Paging C (S1AP)." For example, the position in which the class designation field C1 is set may be a header part of the "Paging C (S1AP)" or a payload part of the "Paging C (S1AP)." The position in which the class designation field C1 is set is not limited to the above, and may be any position.

Figure 15:
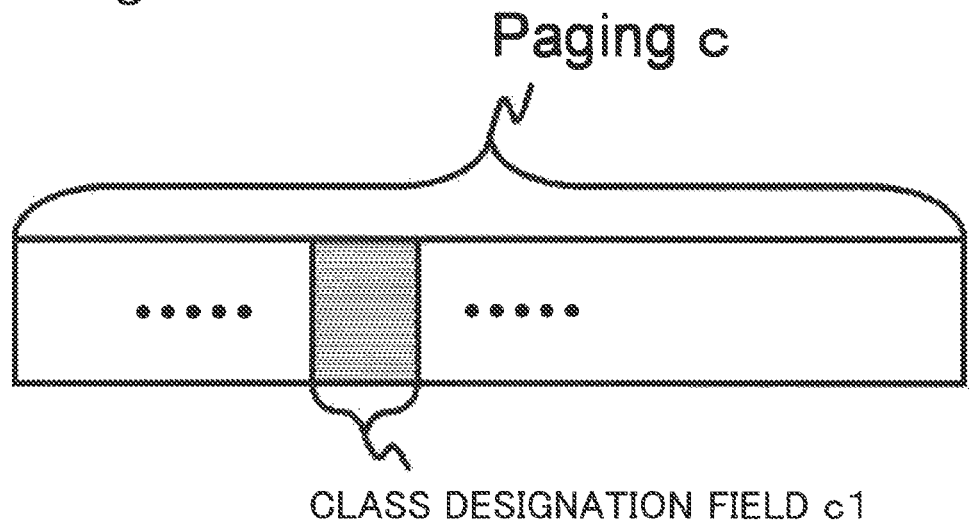
FIG. 15 is a format example of a paging message ["Paging (RRC)"] according to the third example embodiment.

FIG. 15 illustrates a format example of a paging message ["Paging c (RRC)"]. As illustrated in FIG. 15, the "Paging c (RRC)" includes a class designation field c1. The class designation field c1 is a field to which a service class related to a delay time of the terminal 10 is set, based on a paging message ["Paging C (S1AP)"] received by a control unit 210 in a base station 20 from the MME 30.

For example, the control unit 210 may read a service class related to a delay time of the terminal 10, the delay time being included in a paging message ["Paging C(S1AP)"] received from the MME 30, and map (reflect) a service class related to the read delay time of the terminal 10 onto (in) a predetermined field in a paging message ["Paging c(RRC)"] transmitted to the terminal 10. The format example of the paging message illustrated in FIG. 15 is similar to the format example of the paging message illustrated in FIG. 14 except that the paging message transfers over the RRC protocol, and therefore detailed description thereof is omitted.

Figure 16:
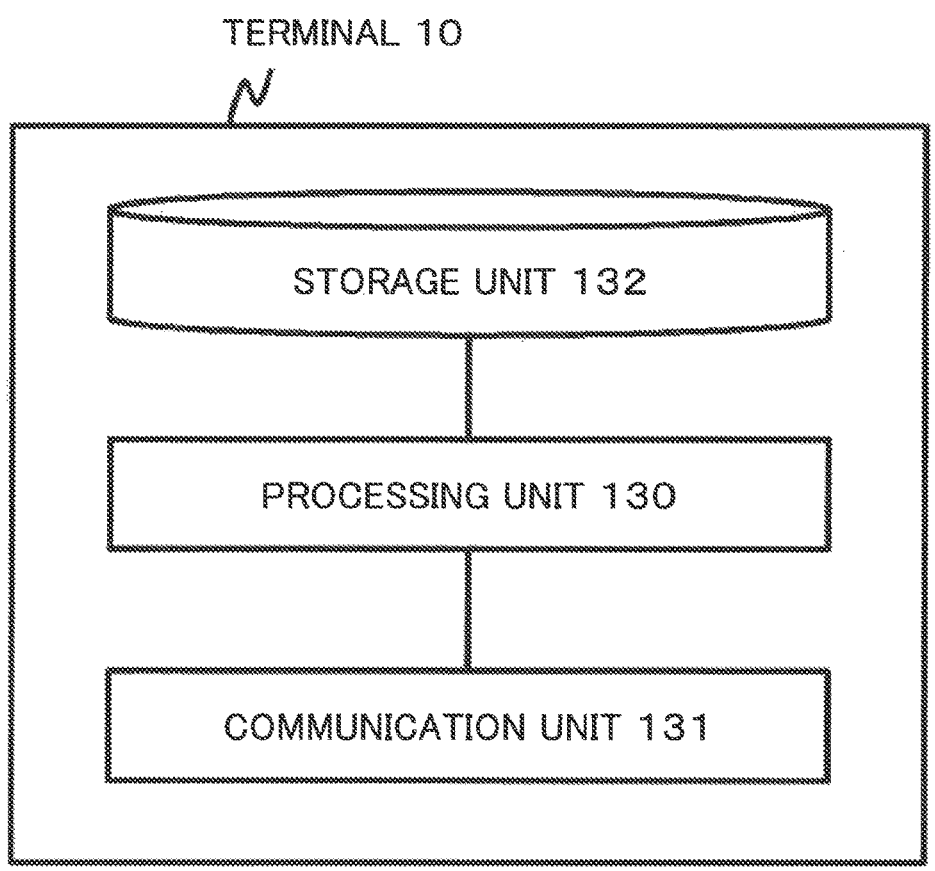
FIG. 16 is a configuration example of a terminal 10 according to the third example embodiment.

FIG. 16 is a configuration example of the terminal 10 according to the third example embodiment. As exemplified in FIG. 16, the terminal 10 includes a storage unit 132, a processing unit 130, and a communication unit 131. The communication unit 131 is similar to the communication unit 111 in the terminal 10 according to the first example embodiment illustrated in FIG. 7, and therefore detailed description thereof is omitted.

The storage unit 132 stores a service class and a delay time of the terminal 10 related to the service class in an associated manner. The information about a related delay time and the like may be designated in any unit such as in seconds, in minutes, or in hours (or in ms).

The processing unit 130 has a function of determining a time (value) at which a control signal ("Service Request") is transmitted, based on a service class included in a "Paging c (RRC)" received from the base station 20. The processing unit 130 refers to the storage unit 132 and determines a delay time of the terminal 10 related to the service class included in the "Paging c (RRC)."

Figure 17:
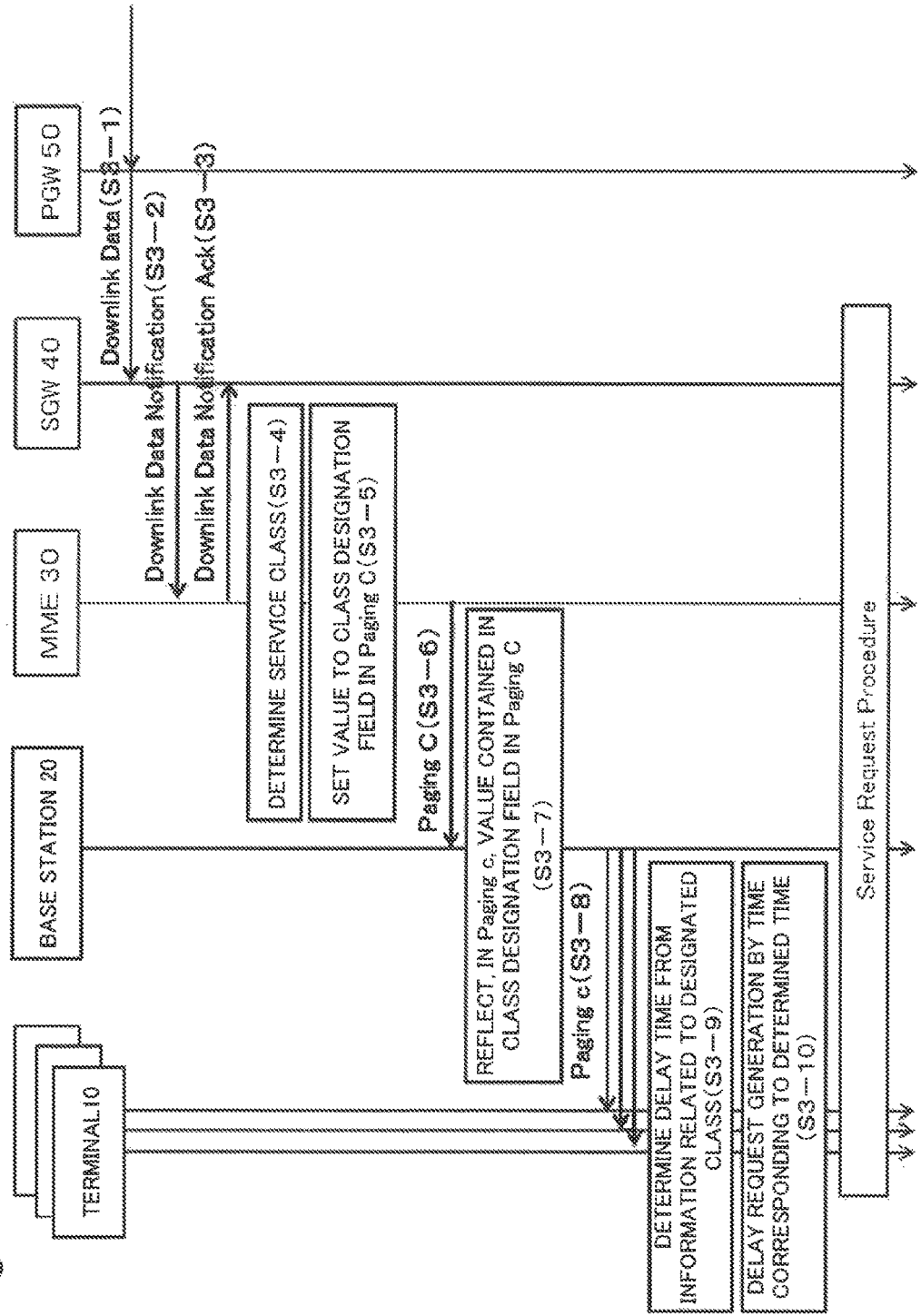
FIG. 17 is a sequence diagram illustrating an operation example of a communication system according to the third example embodiment.

FIG. 17 illustrates an operation example of the communication system according to the third example embodiment. S3-1 to S3-3 in FIG. 17 are similar to S1-1 to S1-3 in the operation example according to the second example embodiment exemplified in FIG. 8, and therefore detailed description thereof is omitted.

For example, the control unit 330 in the MME 30 determines information about a time (a delay time of the terminal 10) by which the terminal 10 delays transmission of a control signal ("Service Request"), and, based on the determined delay time of the terminal 10, refers to the storage unit 332 and determines a service class set to a paging message (S3-4).

The control unit 330 searches for a service class related to the determined delay time of the terminal 10, and sets the service class obtained as a result of the search to a paging message "Paging C (S1AP)" (S3-5). The control unit 330 transmits the paging message "Paging C (S1AP)" including the service class to the base station 20 (S3-6).

In response to receiving the "Paging C (S1AP)," the control unit 210 in the base station 20 reflects a class designation field C1 in the "Paging C (S1AP)" to a class designation field c1 in a "Paging c (RRC)" (S3-7).

A communication unit 211 in the base station 20 transmits the "Paging c (RRC)" to the terminal 10 (S3-8). The communication unit 211 may transmit the "Paging c (RRC)" to a plurality of terminals 10.

The processing unit 130 in the terminal 10 refers to the storage unit 132 and determines a delay time of the terminal 10 related to the service class included in the "Paging c (RRC)" (S3-9).

Based on the determined "delay time of the terminal 10," the processing unit 130 in the terminal 10 delays transmission of a control signal ("Service Request") to the base station 20 by the delay time (S3-10).

As described above, the communication system according to the third example embodiment is able to reduce an information amount stored in a paging message by setting a service class to the paging message.

Fourth Example Embodiment

A fourth example embodiment of the present invention is an example embodiment in a case that a service class (pointer) of a terminal 10, the service class being included in a paging message, is a "basic delay time (value)", and a time (value) at which a predetermined control signal ("Service Request") is transmitted is determined based on the "basic delay time (value)" included in the paging message received by the terminal 10. The technology according to the fourth example embodiment is applicable to any one of the first to third example embodiments and example embodiments to be described later.

According to the fourth example embodiment of the present invention, a service class included in a paging message transmitted from an MME 30 or a base station 20 is associated with a "basic delay time" used for calculating (determining) a time (delay time) by which transmission of a predetermined control signal ("Service Request") is delayed by the terminal 10. The terminal 10 determines a time (delay time) by which transmission of a predetermined control signal ("Service Request") is delayed around (before or after) the "basic delay time" related to the service class included in the paging message.

For example, even when the MME 30 or the base station simultaneously transmits paging messages including a service class related to a same "basic delay time" to a plurality of terminals 10, a time (delay time) by which transmission of a predetermined control signal ("Service Request") is delayed is determined for each of the plurality of terminals 10. In other word, timings for transmitting predetermined control signals ("Service Requests") differ from one terminal to another. Accordingly, timings at which the MME 30 receives the predetermined control signals ("Service Requests") from the plurality of terminals 10 are dispersed, and therefore load increase on the MME 30 can be suppressed.

The communication system according to the fourth example embodiment is similar to the communication system according to the first example embodiment exemplified in FIG. 2, and therefore detailed description thereof is omitted. Further, a configuration of a paging message according to the fourth example embodiment is similar to that of the paging message C or the paging message c according to the third example embodiment illustrated in FIGS. 14 and 15, and therefore detailed description thereof is omitted. Further, a configuration example of the MME 30 according to the fourth example embodiment is similar to that of the MME 30 according to the third example embodiment illustrated in FIG. 13, and therefore detailed description thereof is omitted. Further, a configuration example of the base station 20 according to the fourth example embodiment is similar to that of the base station 20 according to the first example embodiment illustrated in FIG. 5, and therefore detailed description thereof is omitted.

Figure 18:
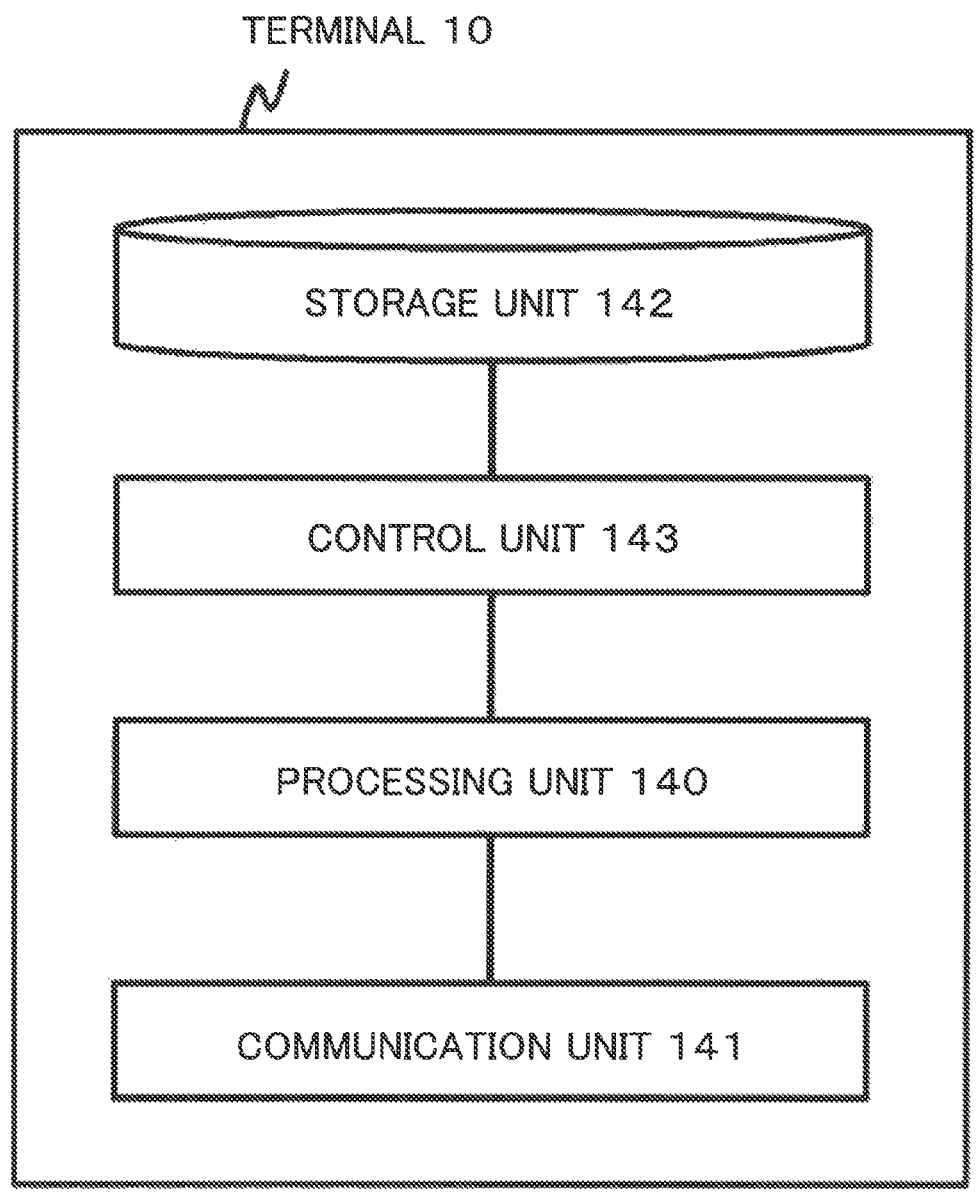
FIG. 18 is a configuration example of a terminal 10 according to a fourth example embodiment.

FIG. 18 is a diagram illustrating a configuration example of the terminal 10 according to the fourth example embodiment. As exemplified in FIG. 18, the terminal 10 includes a storage unit 142, a control unit 143, a processing unit 140, and a communication unit 141.

The communication unit 141 is similar to the communication unit 111 in the terminal 10 according to the first example embodiment exemplified in FIG. 7, and therefore detailed description thereof is omitted.

The storage unit 142 stores a service class and a "basic delay time" related to the service class in an associated manner. The "basic delay time" may be designated in any unit such as in seconds, in minutes, or in hours (or in ms).

The control unit 143 determines a time (value) at which a predetermined control signal ("Service Request") is transmitted, based on a "basic delay time" related to a service class included in a paging message received from the base station 20. For example, the control unit 143 reads a "basic delay time" related to a service class included in a paging message received from the base station 20, and determines a time (delay time of the terminal 10) at which a predetermined control signal is transmitted. For example, the control unit 143 determines a time (value) by which transmission of a predetermined control signal ("Service Request") is delayed around (before or after) a "basic delay time" related to a service class included in a received paging message. The control unit 143 determines a time (value) randomly determined in a predetermined time range, based on a "basic delay time" related to a service class included in a received paging message, to be a time (value) by which transmission of a predetermined control signal ("Service Request") is delayed.

For example, the control unit 143 includes a random number generator, calculates a time (value) designating a timing, based on the "basic delay time" related to the service class included in the received paging message and a number generated by the random number generator, and determines the time to be a delay time of the terminal 10. For example, the control unit 143 defines a range of values that can be taken in a predetermined time range before and after the "basic delay time" related to the service class included in the received "Paging," and then calculates a time (value) designating a timing within the range of values that can be taken, based on the number generated by the random number generator, and determines the time to be a delay time of the terminal 10.

The processing unit 140 in the terminal 10 may have a function of the control unit 143 and determine a delay time of the terminal 10. In this case, a configuration of the terminal 10 becomes similar to the configuration example of the terminal 10 according to the third example embodiment exemplified in FIG. 16.

Based on the "delay time of the terminal 10" determined by the control unit 143, the processing unit 140 in the terminal 10 delays transmission of a control signal ("Service Request") to the base station 20 by the delay time.

Figure 19:
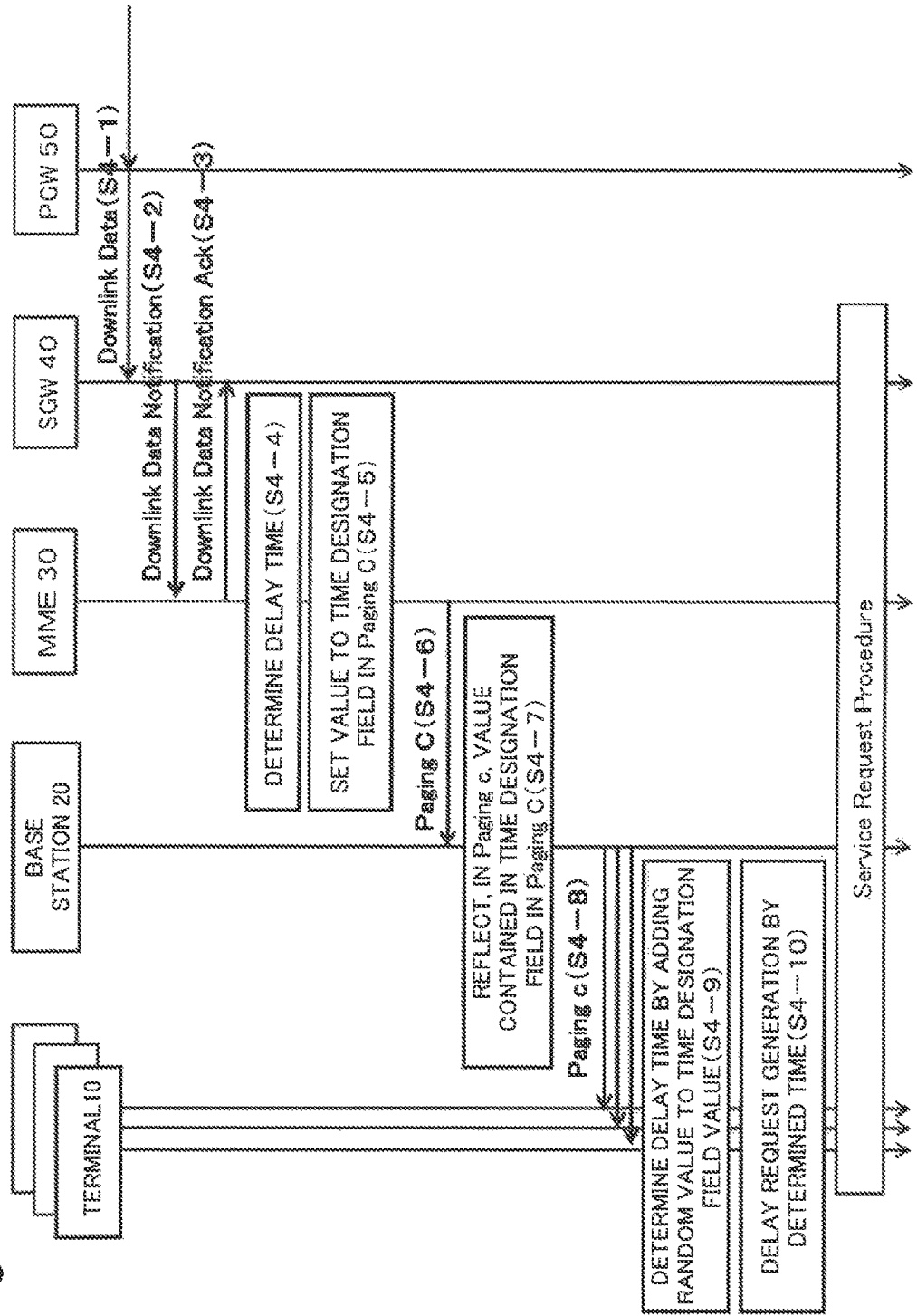
FIG. 19 is a sequence diagram illustrating an operation example of a communication system according to the fourth example embodiment.

FIG. 19 illustrates an operation example of the communication system according to the fourth example embodiment. S4-1 to S4-3 in FIG. 19 are similar to S1-1 to S1-3 in the operation example according to the first example embodiment exemplified in FIG. 8, and therefore detailed description thereof is omitted.

In response to receiving a "Downlink Data Notification," for example, a control unit 330 in the MME 30 determines a "basic delay time" used for calculating (determining) a time (delay time) by which transmission of a predetermined control signal ("Service Request") is delayed by the terminal 10 (S4-4).

Based on the determined "basic delay time," the control unit 330 sets a service class related to the "basic delay time" to a class designation field C1 in a "Paging C" (S4-5), and transmits the "Paging C" to the base station 20 through a processing unit 301 (S4-6). The "Paging C" is a paging message over the S1AP ["Paging (S1AP)"].

In response to receiving the "Paging C," a control unit 210 in the base station 20 reflects the class designation field C1 in the "Paging C (S1AP)" to a class designation field c1 in a "Paging c (RRC)" (S4-7). The "Paging c" is a paging message over the RRC ["Paging (RRC)"].

A communication unit 211 in the base station 20 transmits the "Paging c" to the terminal 10 (S4-8). The communication unit 211 may transmit the "Paging c" to a plurality of terminals 10.

The control unit 143 in the terminal 10 determines a time (value) randomly determined in a predetermined time range, based on a "basic delay time" related to the service class included in the received paging message, to be a time (value) by which transmission of a control signal ("Service Request") is delayed (S4-9).

Based on the delay time determined by the control unit 143, the processing unit 140 in the terminal 10 delays transmission of a control signal ("Service Request") to the base station 20 by the delay time (S4-10).

As described above, for example, even when the MME 30 or the base station 20 simultaneously transmits paging messages including a service class related to a same "basic delay time" to a plurality of terminals 10, the communication system according to the fourth example embodiment determines a time (delay time) by which transmission of a predetermined control signal ("Service Request") is delayed, for each of the plurality of terminals 10. Accordingly, timings at which the MME 30 receives predetermined control signals ("Service Requests") from the plurality of terminals 10 are dispersed, and therefore load increase on the MME 30 can be suppressed.

Fifth Example Embodiment

A fifth example embodiment of the present invention is an example embodiment in a case that a service class (pointer) of a terminal 10 included in a paging message is information (an upper limit and a lower limit) about a "predetermined time range," and the terminal 10 determines a time (value) at which a control signal ("Service Request") is transmitted, from the predetermined time range (within a range from a lower limit to an upper limit). The technology according to the fifth example embodiment is applicable to any one of the respective first to fourth example embodiments and example embodiments to be described later.

According to the fifth example embodiment, for example, even when an MME 30 or a base station 20 simultaneously transmits paging messages including a service class related to information (an upper limit and a lower limit) about a "predetermined time range" to a plurality of terminals 10, a time (delay time) by which transmission of a predetermined control signal ("Service Request") is delayed is determined for each of the plurality of terminals 10. In other words, timings for transmitting predetermined control signals ("Service Requests") differ from one terminal to another. Accordingly, timings at which the MME 30 receives the predetermined control signals ("Service Requests") from the plurality of terminals 10 are dispersed, and therefore load increase on the MME 30 can be suppressed.

For example, the MME 30 or the base station 20 may set information (an upper limit and a lower limit) about a "predetermined time range" related to a service class included in a paging message for each terminal 10. Further, for example, the MME 30 or the base station 20 may set information (an upper limit and a lower limit) about a "predetermined time range" related to a service class included in a paging message for each group of terminals 10. For example, the group of terminals 10 are determined based on an attribute of a terminal 10, and terminals 10 of a same attribute type (e.g. a plurality of MTC devices of a same type) are included in a same group. For example, the attribute of a terminal 10 may be determined based on a service type that may be provided by the terminal 10, priority of the terminal 10, and the like.

A communication system according to the fifth example embodiment is similar to the communication system according to the first example embodiment exemplified in FIG. 2, and therefore detailed description thereof is omitted. Further, a configuration of a paging message according to the fifth example embodiment is similar to that of the paging message C or c according to the third example embodiment illustrated in FIGS. 14 and 15, and therefore detailed description thereof is omitted. Further, a configuration example of the base station 20 according to the fifth example embodiment is similar to that of the base station 20 according to the first example embodiment illustrated in FIG. 5, and therefore detailed description thereof is omitted.

Figure 20:
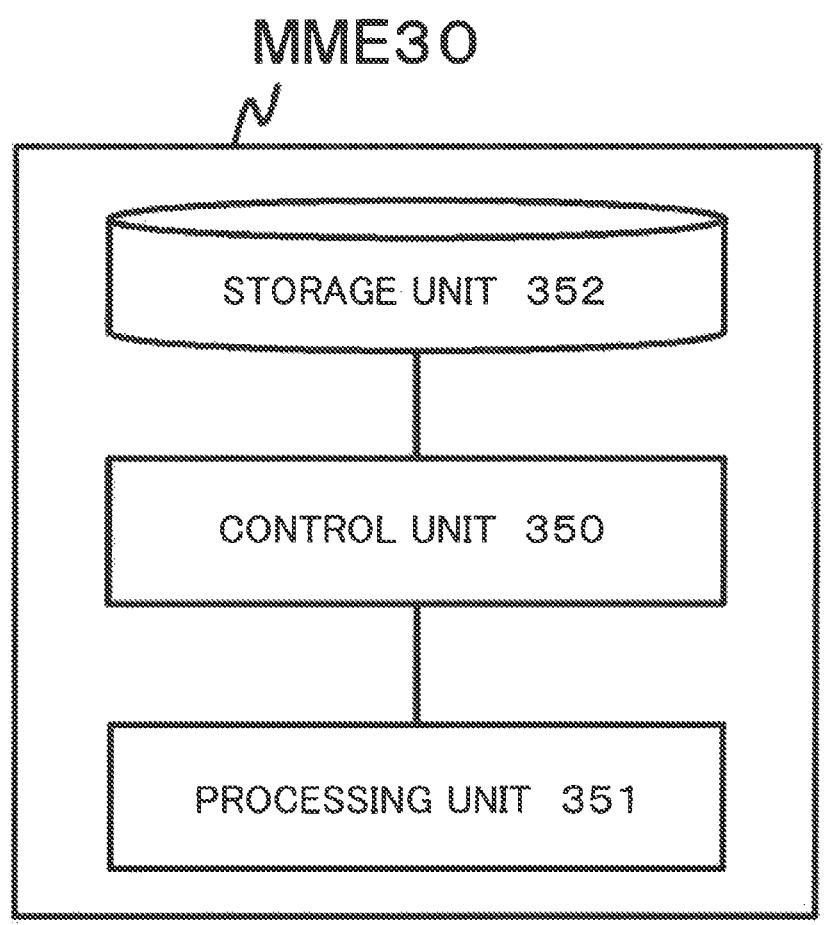
FIG. 20 is a configuration example of an MME 30 according to a fifth example embodiment.

FIG. 20 is a configuration example of the MME 30 according to the fifth example embodiment. As illustrated in FIG. 20, the MME 30 includes a storage unit 352, a control unit 350, and a processing unit 351. The processing unit 351 has a configuration similar to the processing unit 301 in the MME 30 according to the first example embodiment exemplified in FIG. 3, and therefore detailed description thereof is omitted.

For example, the control unit 350 has a function of determining information about a time (value) at which the terminal 10 transmits a control signal ("Service Request"), and determines an upper limit and a lower limit of a time (delay time of the terminal 10) by which the terminal 10 delays transmission of a control signal. For example, the control unit 350 determines an upper limit and a lower limit of a delay time of the terminal 10, depending on a terminal type and network congestion status. For example, the control unit 350 may determine predetermined values to be an upper limit and a lower limit of a delay time of the terminal 10. For example, the control unit 350 may determine values (two values) randomly determined from a predetermined time range to be an upper limit and a lower limit. The method of the control unit 350 determining an upper limit and a lower limit is not limited to the examples, and may be any method.

For example, the control unit 350 sets a service class related to an upper limit and a lower limit of a time (delay time of the terminal 10) by which the terminal 10 delays transmission of a control signal to a predetermined field in a paging message ["Paging D (S1AP)"].

Figure 21:
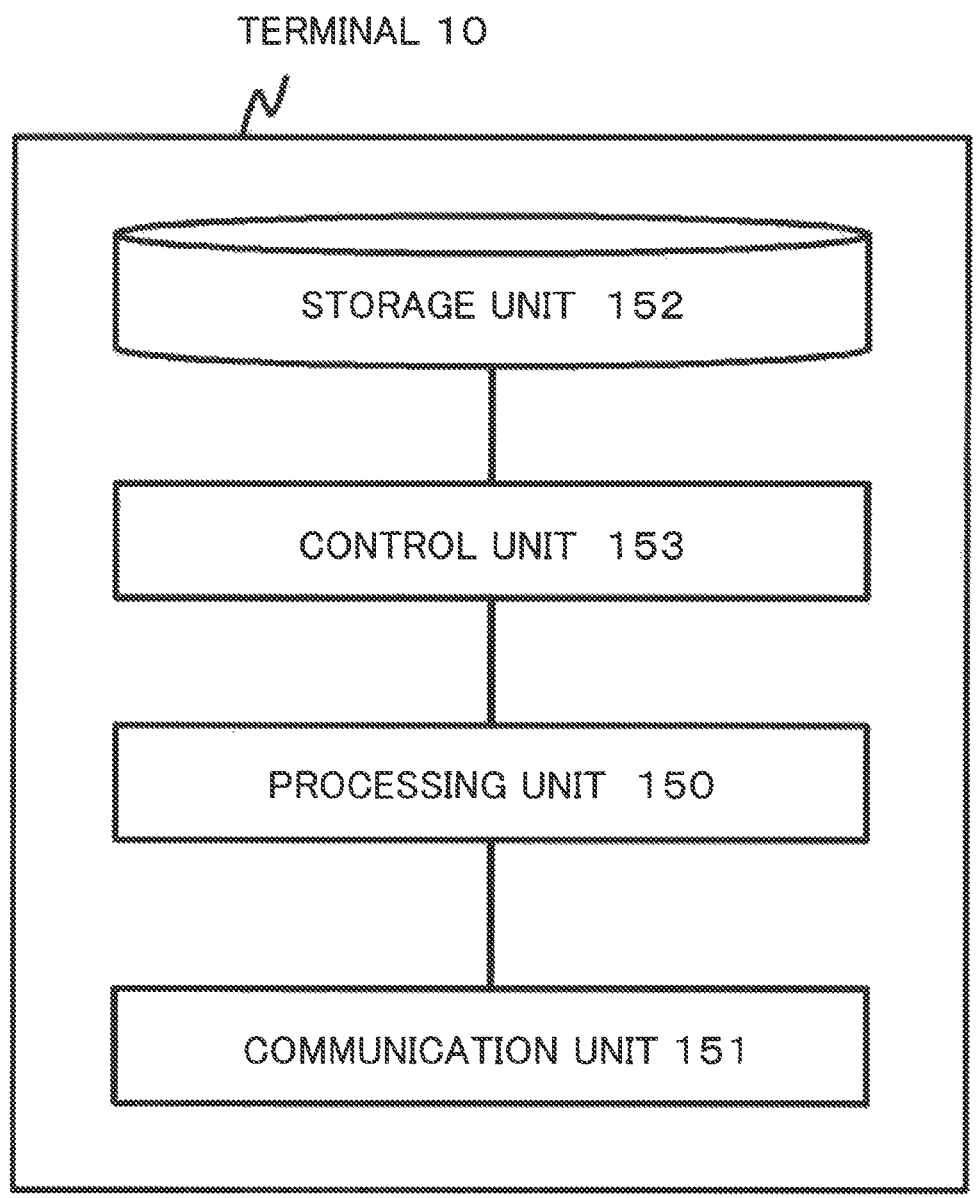
FIG. 21 is a configuration example of a terminal 10 according to the fifth example embodiment.

FIG. 21 is a configuration example of the terminal 10 according to the fifth example embodiment. As exemplified in FIG. 21, the terminal 10 includes a storage unit 152, a control unit 153, a processing unit 150, and a communication unit 151. The communication unit 151 is similar to the communication unit 111 in the terminal 10 according to the first example embodiment exemplified in FIG. 7, and therefore detailed description thereof is omitted.

The storage unit 152 stores a service class and information (an upper limit and a lower limit) about a "predetermined time range" related to the service class in an associated manner. The information (an upper limit and a lower limit) about a "predetermined time range" may be designated in any unit such as in seconds, in minutes, or in hours (or in ms).

The control unit 153 has a function of determining a time (value) at which a control signal ("Service Request") is transmitted, based on an upper limit and a lower limit of a delay time of the terminal 10, the limits being related to a service class included in a "Paging c (RRC)" received from the base station 20. For example, the control unit 153 includes a random number generator and determines a delay time of the terminal 10, based on a number generated by the random number generator, within a range determined by the upper limit and the lower limit, the limits being related to the service class included in the received paging message. The method of the control unit 153 determining a delay time of the terminal 10, based on an upper limit and a lower limit, the limits being included in a received paging message, may be any method such as conforming to a predetermined algorithm.

The processing unit 150 in the terminal 10 may have a function of the control unit 153 and determine a delay time of the terminal 10. In this case, a configuration of the terminal 10 becomes similar to the configuration example of the terminal 10 according to the third example embodiment exemplified in FIG. 16.

Based on a "delay time of the terminal 10" determined by the control unit 153, the processing unit 150 in the terminal 10 delays transmission of a control signal ("Service Request") to the base station 20 by the delay time.

Figure 22:
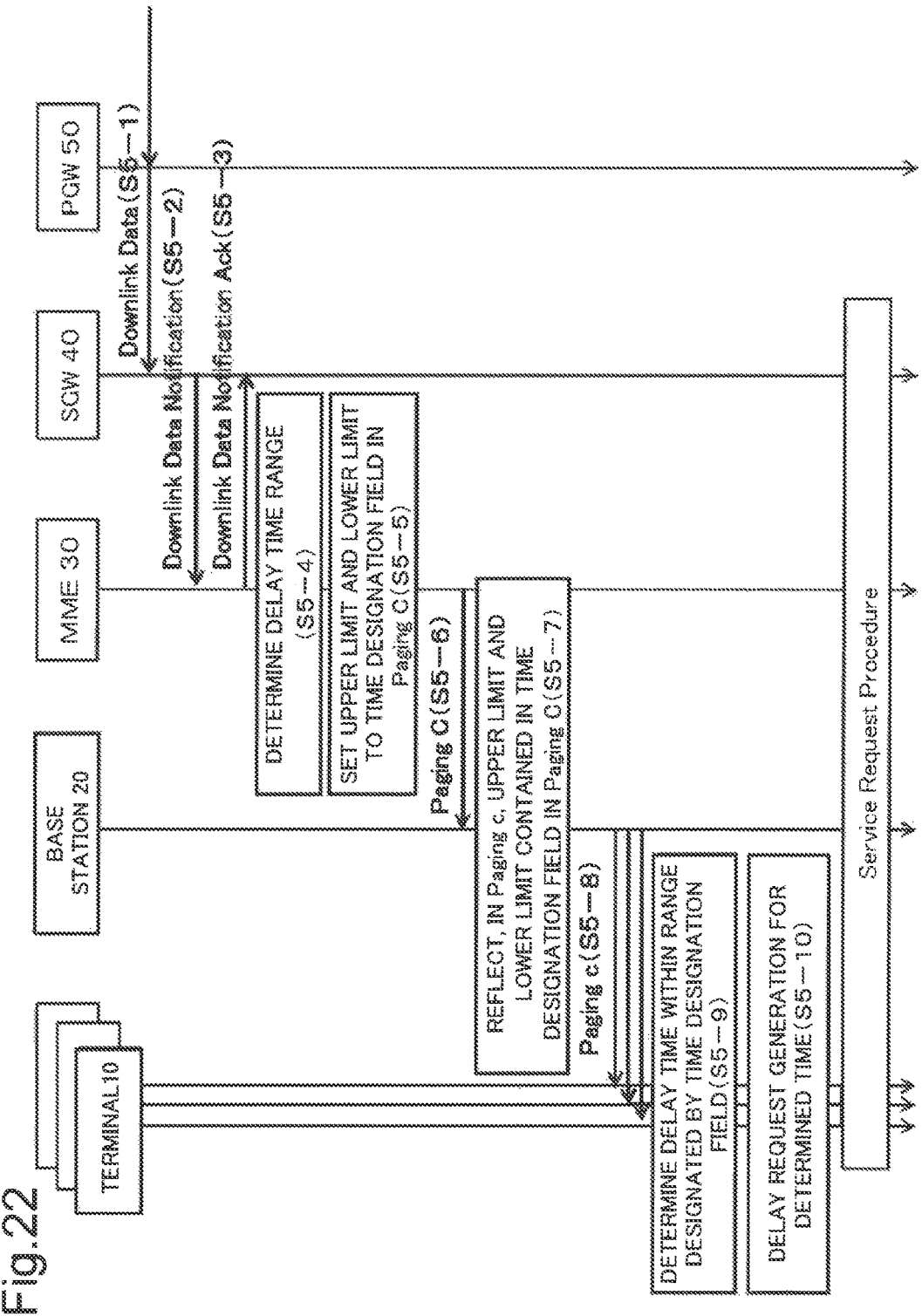
FIG. 22 is a sequence diagram illustrating an operation example of a communication system according to the fifth example embodiment.

FIG. 22 illustrates an operation example of the communication system according to the fifth example embodiment. S5-1 to S5-3 in FIG. 22 are similar to S1-1 to S1-3 in the operation example according to the first example embodiment illustrated in FIG. 8, and therefore detailed description thereof is omitted.

The control unit 352 in the MME 30 determines an upper limit and a lower limit of a time (delay time of the terminal 10) by which the terminal 10 delays transmission of a control signal (S5-4). For example, the control unit 350 sets a service class related to the determined upper limit and lower limit of the delay time of the terminal 10 to a class designation field C1 in a paging message ["Paging C (S1AP)"] (S5-5).

The control unit 350 in the MME transmits the "Paging C (S1AP)" to the base station 20 through the processing unit 321 (S5-6).

In response to receiving the "Paging C (S1AP)," a control unit 210 in the base station 20 reflects the class designation field C1 in the "Paging C (S1AP)" to a class designation field c1 in a "Paging c (RCC)" (S5-7).

A communication unit 211 in the base station 20 transmits the "Paging c (RCC)" to the terminal 10 (S5-8). The communication unit 211 may transmit the "Paging c (RCC)" to a plurality of terminals 10.

Based on an upper limit and a lower limit of a delay time of the terminal 10 related to the service class included in the "Paging c (RCC)" received from the base station 20, the control unit 153 in the terminal 10 determines a time (value) at which a control signal ("Service Request") is transmitted (S5-9).

Based on the "delay time of the terminal 10" determined by the control unit 153, the processing unit 150 in the terminal 10 delays transmission of a control signal ("Service Request") to the base station 20 by the delay time (S5-10).

As described above, based on an upper limit and a lower limit of a delay time of the terminal 10, the limits being determined by the MME 30, the communication system according to the fifth example embodiment is able to determine a time (delay time) by which transmission of a predetermined control signal ("Service Request") is delayed, within a range from the lower limit to the upper limit on the terminal 10 side. Accordingly, the MME 30 is able to receive control signals from the plurality of terminals 10 in a dispersed manner.

Sixth Example Embodiment

A sixth example embodiment of the present invention is an example embodiment in a case that information indicating a group to which a plurality of terminals being call targets belong is set to a paging message, in addition to a service class described in the third to fifth example embodiments. The technology according to the sixth example embodiment is applicable to any one of the respective first to fifth example embodiments and example embodiments to be described later.

For example, terminals 10 according to the sixth example embodiment are grouped into a plurality of groups depending on a service that may be provided. For example, a plurality of terminals 10 that are able to provide a same M2M service are grouped into a same group. For example, a plurality of terminals 10 of a same attribute (e.g. a plurality of MTC devices of a same type) are grouped into a same group. For example, a plurality of terminals 10 for a same service may be grouped by subscribers. Further, for example, a plurality of terminals 10 may be grouped by operators [mobile network operators (MNO) and mobile virtual network operators (MVNO)].

According to the sixth example embodiment, an MME 30 is able to transmit a paging message designating a plurality of terminals in a same group as call targets, and a number of paging messages transmitted when calling the plurality of terminals can be reduced.

In a "Paging" in the "Network Triggered Service Request" described in Section 5.3.4.3 in the 3GPP specifications (TS 23.401 v12.0.0), the MME 30 transmits a paging message for each terminal 10. Accordingly, even when it is desirable to call a plurality of terminals 10 belonging to a same group simultaneously, the MME 30 is required to transmit a paging message to each of the plurality of terminals 10. Accordingly, for example, when a large number of terminals 10 belonging to a same group exist, the MME 30 is required to transmit a paging message to each of the large number of terminals 10, which is a main cause of load increase on the MME 30.

As described above, the MME 30 according to the sixth example embodiment is able to transmit a paging message having a plurality of terminals in a same group as call targets, and therefore, even when a large number of terminals 10 belonging to a same group exist, the MME 30 is not required to transmit a paging message to each of the large number of terminals 10, and load increase on the MME 30 can be prevented.

A communication system according to the sixth example embodiment is similar to the communication system according to the first example embodiment exemplified in FIG. 2, and therefore detailed description thereof is omitted. Further, a configuration example of a base station 20 according to the sixth example embodiment is similar to that of the base station 20 according to the first example embodiment illustrated in FIG. 5, and therefore detailed description thereof is omitted.

Figure 23:
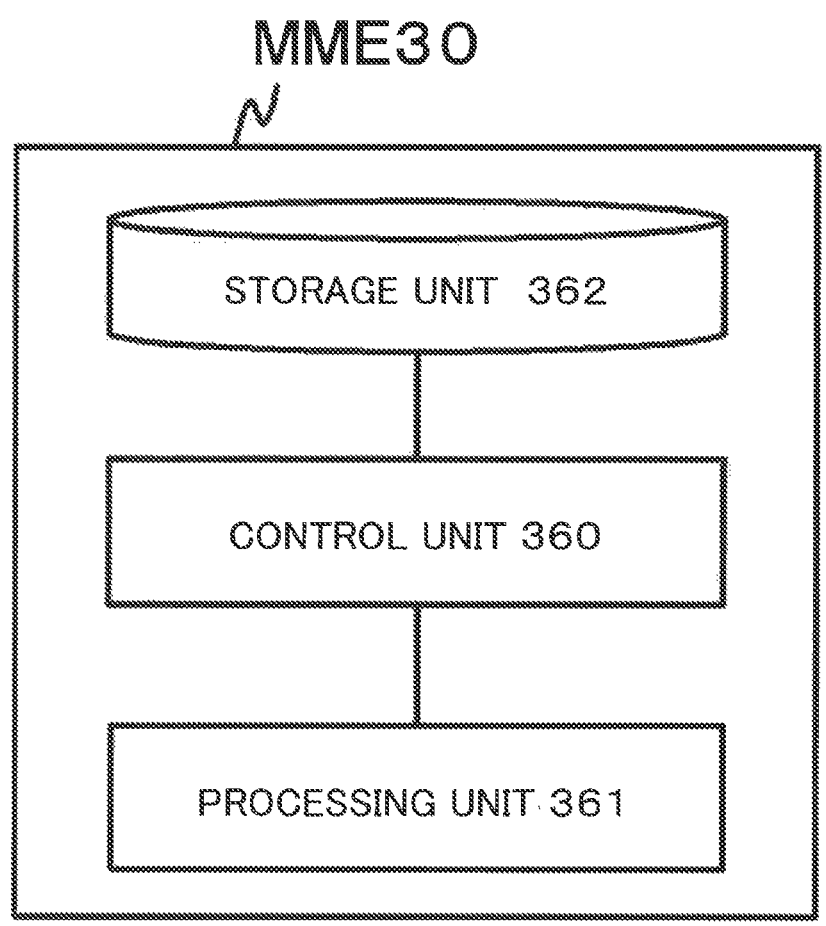
FIG. 23 is a configuration example of an MME 30 according to a sixth example embodiment.

FIG. 23 is a configuration example of the MME 30 according to the sixth example embodiment. As illustrated in FIG. 23, the MME 30 includes a storage unit 362, a control unit 360, and a processing unit 361. The processing unit 361 has a configuration similar to that of the processing unit 311 in the terminal 10 according to the first example embodiment exemplified in FIG. 3, and therefore detailed description thereof is omitted.

For example, the control unit 360 has a function of setting information indicating a group to which a terminal 10 belongs to a predetermined field in a paging message ["Paging E (S1AP)"].

For example, the information indicating a group to which a terminal 10 belongs is information that is able to specify a predetermined service enjoyed by the terminal 10. For example, the information indicating a group to which a terminal 10 belongs is information indicating priority of the terminal 10 [e.g. a low access priority indicator (LAPI)]. For example, the information indicating a group to which a terminal 10 belongs is information indicating being a predetermined machine type communication (MTC) device. The information indicating a group to which a terminal 10 belongs is information indicating being in a group of terminals treated equally in any service. The information indicating a group to which a terminal 10 belongs is information indicating being in a group of terminals grouped in accordance with any rule and in response to a user request. For example, the information indicating a group to which a terminal 10 belongs is information by which an operator (an MNO or an MVNO) to which the terminal 10 subscribes [e.g. a public land mobile network (PLMN)] can be identified.

The control unit 360 has a function of setting a service class of a terminal 10 in a predetermined field in a paging message ["Paging D (S1AP)"]. The process of the control unit 360 setting a service class related to information about a time (timing) to a paging message is similar to that by the control unit 330 in the MME 30 according to the third example embodiment exemplified in FIG. 13, and therefore detailed description thereof is omitted.

Figure 24:
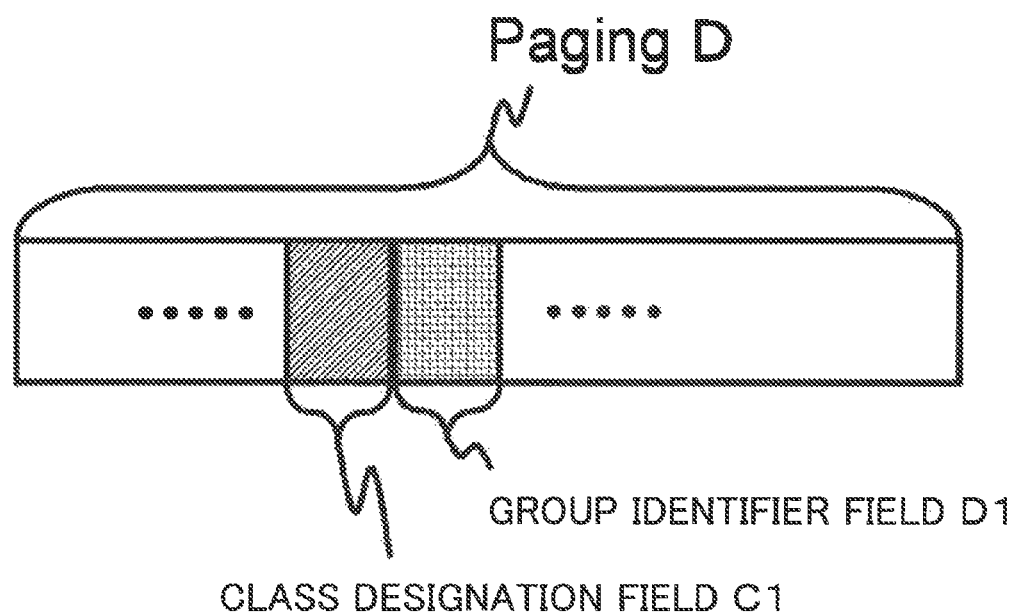
FIG. 24 is a format example of a paging message ["Paging (S1AP)"] according to the sixth example embodiment.

FIG. 24 illustrates a format example of the paging message ["Paging D (S1AP)"] according to the sixth example embodiment. As exemplified in FIG. 24, the "Paging D (S1AP)" includes a class designation field C1 and a group identifier field D1. The class designation field C1 is a predetermined field to which the control unit 360 sets, for example, a service class related to information about a delay time. The group identifier field D1 is a field to which information indicating a group to be a call target, the group being determined by the control unit 360, is set.

For example, the class designation field C1 and the group identifier field D1 are set in predetermined positions in the "Paging D (S1AP)" message. For example, the positions in which the class designation field C1 and the group identifier field D1 are set may be a header part of the "Paging D (S1AP)" or a payload part of the "Paging D (S1AP)." The positions in which the class designation field C1 and the group identifier field D1 are set are not limited to the above, and may be any positions. Further, the class designation field C1 and the group identifier field D1 are not necessarily required to be in adjacent positions (fields) in the "Paging D (S1AP)" message, and may be in positions (fields) separated from one another.

While the class designation field C1 and the group identifier field D1 are set in different fields in the example in FIG. 24, the fields may be set in a same field.

Figure 25:
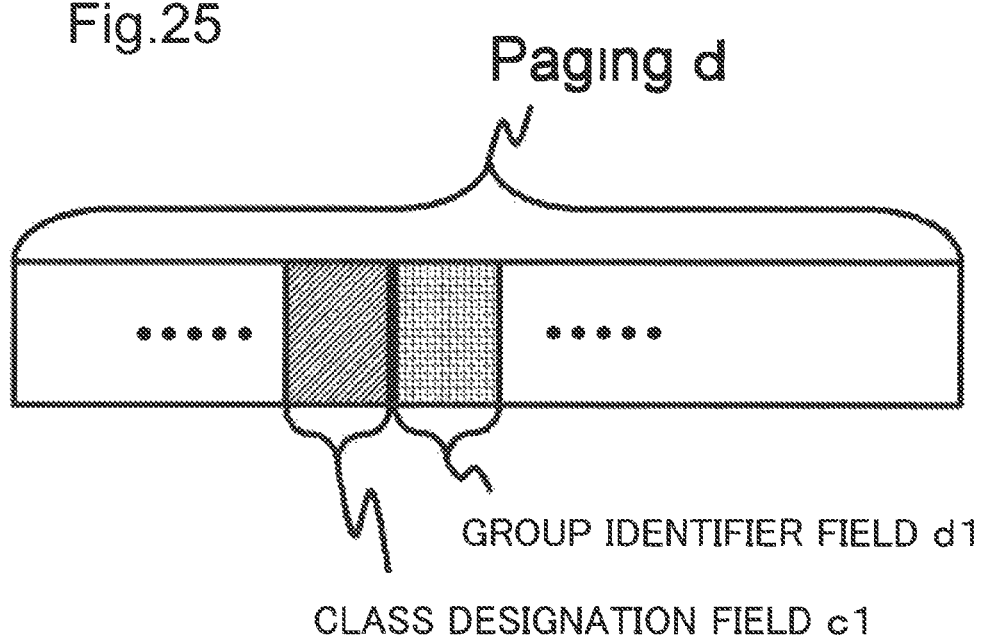
FIG. 25 is a format example of a paging message ["Paging (RRC)"] according to the sixth example embodiment.

FIG. 25 illustrates a format example of a paging message ["Paging d (RRC)"]. As illustrated in FIG. 25, the "Paging d (RRC)" includes a group identifier field d1. The group identifier field d1 is a field to which a control unit 210 in the base station 20 sets information indicating a group to which a terminal 10 belongs, based on a group identifier field D1 included in a paging message ["Paging D (S1AP)"] received from the MME 30. Further, the "Paging d (RRC)" includes a class designation field c1. The class designation field c1 is a field to which the control unit 210 in the base station 20 sets information setting a service class of a terminal 10, based on a class designation field C1 included in the paging message ["Paging D (S1AP)"] received from the MME 30. For example, the control unit 210 may read information indicating a group, and a service class that are included in a paging message ["Paging D(S1AP)"] received from the MME 30, and map (reflect) the read information indicating the group and the read service class onto (in) a predetermined field in a paging message ["Paging d(RRC)"] transmitted to the terminal 10. The format example of the paging message illustrated in FIG. 25 is similar to the format example of the paging message illustrated in FIG. 24 except that the paging message transfers over the RRC protocol, and therefore detailed description thereof is omitted.

Figure 26:
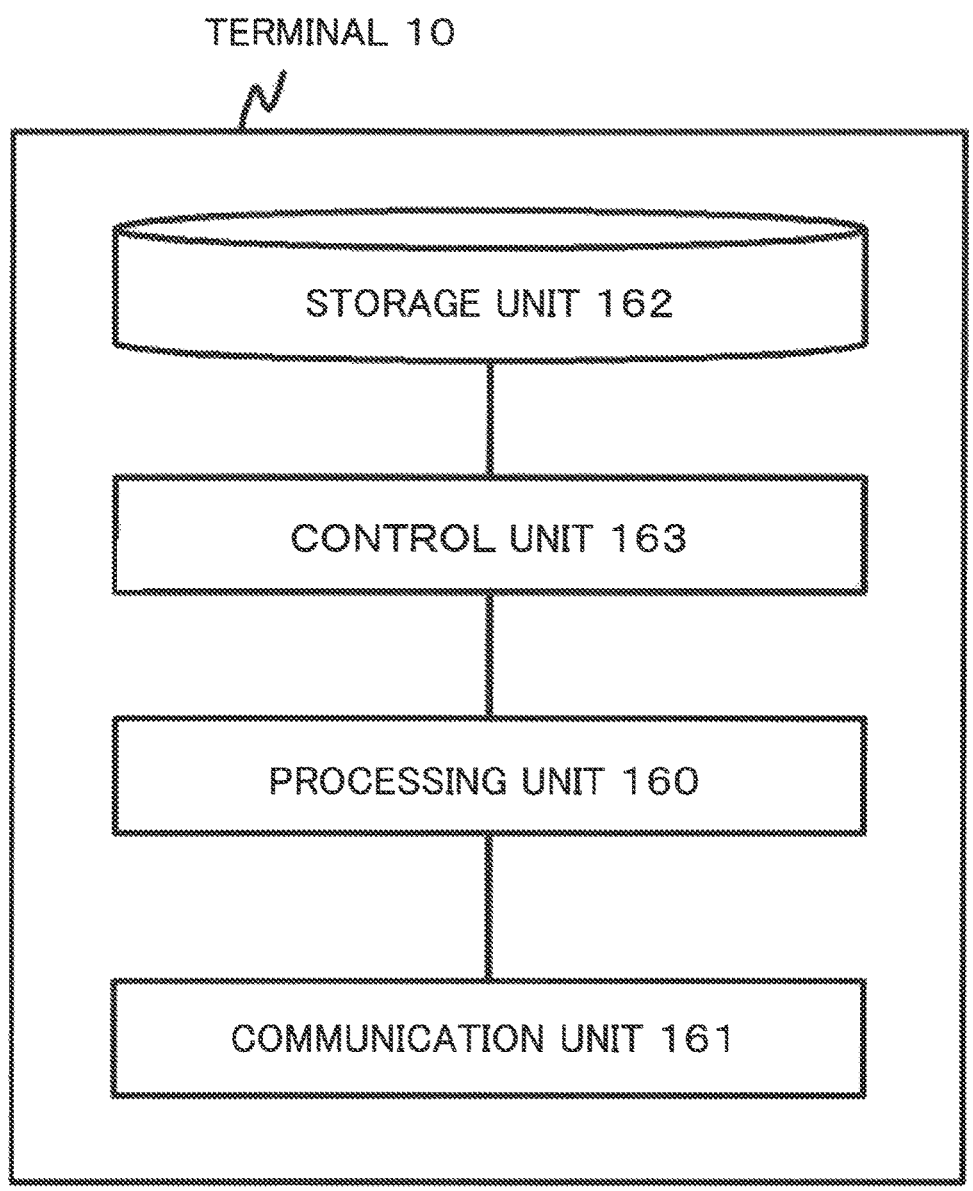
FIG. 26 is a configuration example of a terminal 10 according to the sixth example embodiment.

FIG. 26 is a configuration example of the terminal 10 according to the sixth example embodiment. As exemplified in FIG. 26, the terminal 10 includes a storage unit 162, a control unit 163, a processing unit 160, and a communication unit 161.

The communication unit 161 is similar to the communication unit 111 in the terminal 10 according to the first example embodiment exemplified in FIG. 7, and therefore detailed description thereof is omitted.

The processing unit 160 transmits a control signal ("Service Request") in response to a group specified based on information indicating a group of a terminal 10, the information being included in a "Paging d (RRC)" received from the base station 20, matching a group to which the local terminal belongs. In this case, the processing unit 160 delays transmission of the control signal by a delay time (a time by which transmission of a control signal is delayed) determined based on information about a time (timing) related to a service class included in the "Paging d (RRC)."

Depending on whether or not a group specified as a call target, based on information included in the "Paging d (RRC)" received from the base station 20, matches a group to which the local terminal belongs, the processing unit 160 may determine whether or not to respond to the "Paging d (RRC)." For example, the processing unit 160 determines to respond to a "Paging d (RRC)" in response to a group specified as a call target, the group being included in the "Paging d (RRC)," matching a group of the local terminal.

In response to determining to respond to a "Paging d (RRC)," the control unit 163 determines a time (value) at which a control signal ("Service Request") is transmitted, based on information about a time (timing) related to a service class included in the "Paging d (RRC)." The processing unit 160 may determine a time (value) at which a control signal ("Service Request") is transmitted, based on information about a time (timing) related to a service class included in a "Paging d (RRC)."

The method of the control unit 163 or the processing unit 160 determining a time (value) at which a control signal is transmitted is similar to that by the processing unit 130 exemplified in FIG. 16 or the control unit 143 exemplified in FIG. 18, and therefore detailed description thereof is omitted.

Figure 27:
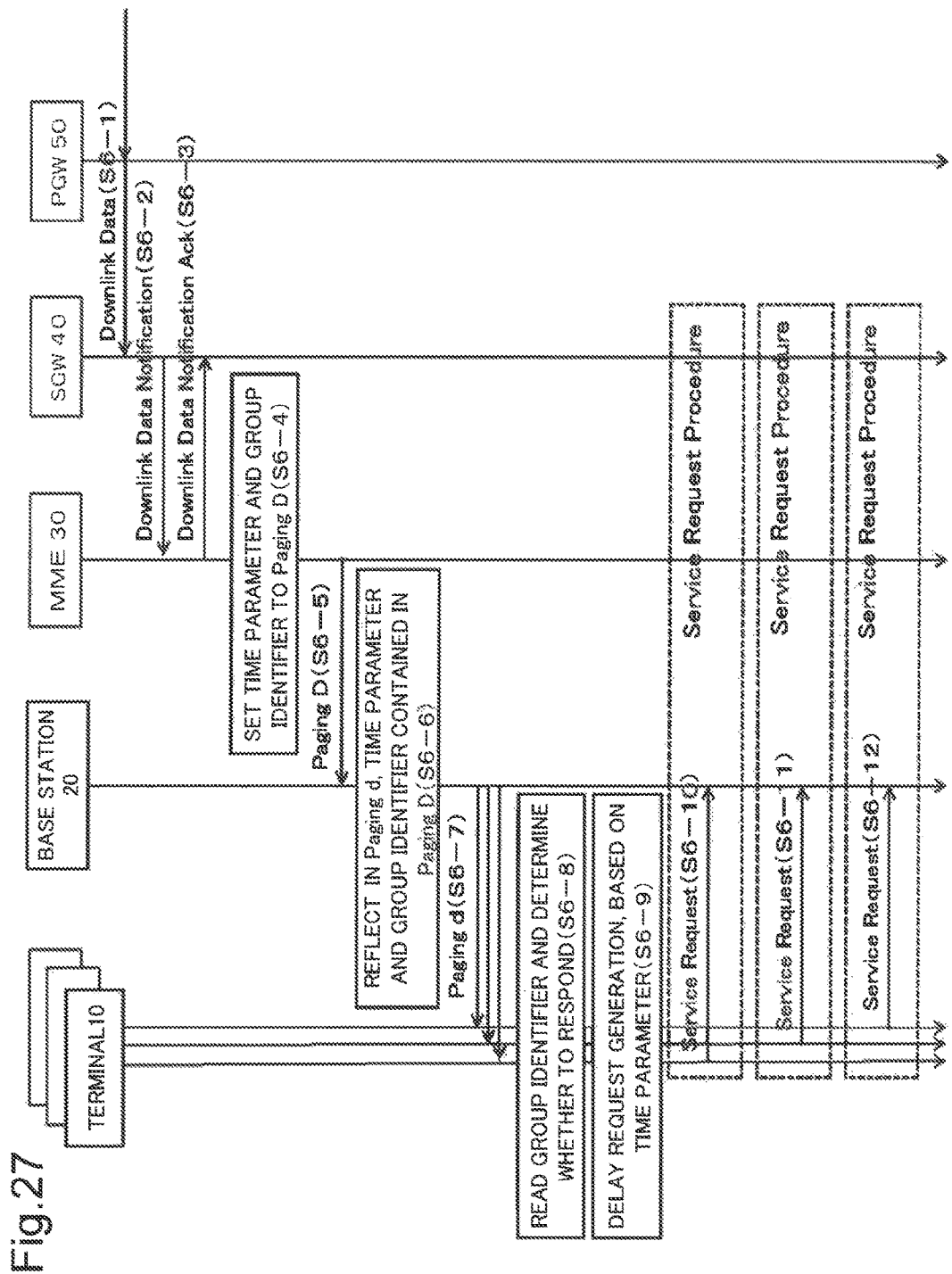
FIG. 27 is a sequence diagram illustrating an operation example of a communication system according to the sixth example embodiment.

FIG. 27 illustrates an operation example of the communication system according to the sixth example embodiment. S6-1 to S6-3 in FIG. 27 are similar to S1-1 to S1-3 in the operation example according to the first example embodiment illustrated in FIG. 8, and therefore detailed description thereof is omitted.

For example, the control unit 360 in the MME 30 sets a service class related to information about a time (timing) at which the terminal 10 transmits a "Service Request," and information indicating a group of the terminal 10 to a paging message (S6-4). The control unit 360 transmits to the base station a paging message "Paging D (S1AP)" including the service class and the information indicating the group to which the terminal 10 belongs (S6-5).

In response to receiving the "Paging D (S1AP)," the control unit 210 in the base station 20 reflects the class designation field C1 and the group identifier field D1 in the Paging D (S1AP) to a class designation field c1 and a group identifier field d1 in a "Paging d (RRC)" (S6-6).

A communication unit 211 in the base station 20 transmits the "Paging d (RRC)" to the terminal 10 (S6-7). The communication unit 211 may transmit the "Paging d (RRC)" to a plurality of terminals 10.

Depending on whether or not a group specified as a call target, the group being included in the "Paging d (RRC)" received from the base station 20, matches a group of the local terminal, the processing unit 160 in the terminal 10 determines whether or not to respond to the "Paging d (RRC)" (S6-8).

In response to determining to respond to the "Paging d (RRC)," the control unit 163 determines a time (value) at which a control signal ("Service Request") is transmitted, based on information about a time (timing) related to the service class included in the "Paging d (RRC)" (S6-9).

The processing unit 160 transmits the control signal at the determined time (value) (S6-10). A plurality of terminals 10 belonging to a group specified by the information included in the "Paging d (RRC)" respond to the "Paging d (RRC)" and transmit control signals ("Service Requests") (S6-10 to S6-12).

As described above, the communication system according to the sixth example embodiment sets information indicating a group to which a plurality of terminals being call targets belong to a paging message, and therefore the MME 30 is able to transmit a paging message designating a plurality of terminals in a same group as call targets and reduce a number of transmitted paging messages.

Seventh Example Embodiment

A seventh example embodiment of the present invention is an example embodiment in a case that, when transmitting a paging message to a predetermined terminal 10, an SCS 80 holds (reserves) a packet on a user plane related to the predetermined terminal 10 until setting of a bearer of the predetermined terminal 10 is completed. The technology according to the seventh example embodiment is applicable to any one of the first to sixth example embodiments and an example embodiment to be described later.

When a mobile network receives a packet to be transmitted to the terminal 10 in a procedure of the "Network Triggered Service Request" described in Section 5.3.4.3 in the 3GPP specifications (TS23.401 v12.0.0), first, the packet is transferred to an S-GW 40. Subsequently, in response to receiving the packet, the S-GW 40 immediately notifies a "Downlink Data Notification" to an MME 30, and the MME 30 receiving the notification transmits a paging message. Consequently, for example, when same information not requiring a real-time property is distributed to a plurality of terminals 10 existing in the mobile network, concentrated transmission of paging messages is requested to the MME 30, which is a main cause of load increase on the MME 30.

For example, in the aforementioned case of same information not requiring a real-time property being distributed to a plurality of terminals 10, since a necessity for immediate distribution of information to each terminal 10 is low, the seventh example embodiment is able to suppress load increase on the MME 30 by providing the SCS 80 and distributing information to each terminal 10 while adjusting timings.

According to the seventh example embodiment, the SCS 80 requests the MME 30 to transmit a paging message, and the SCS 80 reserves transfer to the S-GW 40 with respect to a packet to be transmitted to a terminal 10. Then, after bearer setting of the terminal 10 is completed, the SCS 80 transfers the packet to the S-GW 40. Accordingly, even when the S-GW 40 receives a packet, a bearer of the terminal 10 is already set, and therefore is able to transfer the packet to the terminal 10 by using the bearer, without requesting the MME 30 to transmit a paging message. Accordingly, the MME 30 is no longer required to perform "transmission of a paging message" caused by the S-GW 40 receiving a packet, and is able to prevent load increase on the MME 30. For example, the SCS 80 according to the seventh example embodiment receives a data transmission request from an external application or the like, with respect to a plurality of terminals 10 with a predetermined attribute, and, in response to the request, requests the MME 30 to transmit paging messages addressed to the plurality of terminals 10. In this case, the MME 30 may transmit a paging message including information indicating a group to which the plurality of terminals belong, or, similarly to the first or second example embodiment, transmit a paging message to each of the plurality of the terminals. While an example of the MME 30 transmitting a paging message including information indicating the group to which the plurality of terminals belong will be hereinafter described, a configuration example of a paging message transmitted by the MME according to the seventh example embodiment may be similar to that of any one of the Paging A illustrated in FIG. 4, the Paging B illustrated in FIG. 10, the Paging C illustrated in FIG. 14, and the Paging D illustrated in FIG. 24. Further, a configuration example of a paging message transmitted by a base station 20 according to the seventh example embodiment may be similar to that of any one of the Paging a illustrated in FIG. 6, the Paging b illustrated in FIG. 11, the Paging c illustrated in FIG. 15, and the Paging d illustrated in FIG. 25.

Figure 28:
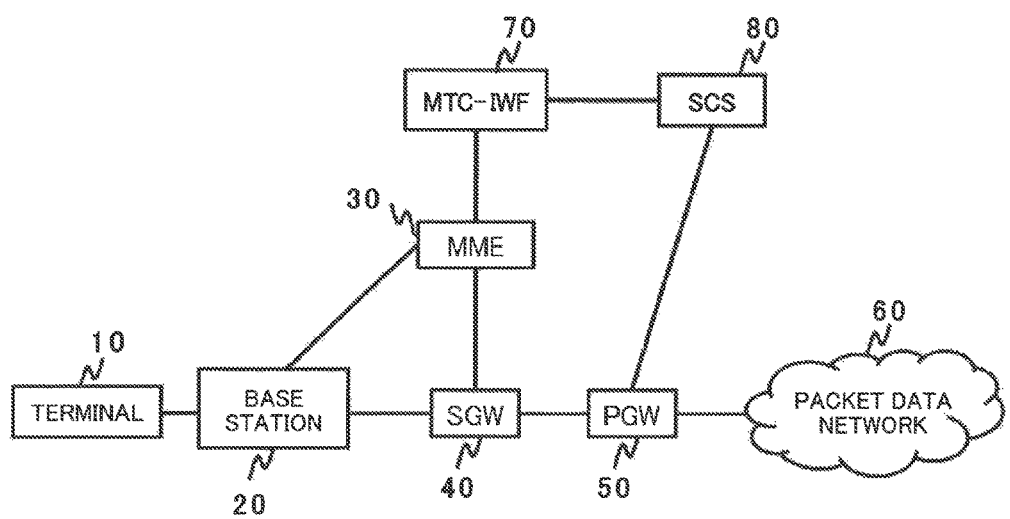
FIG. 28 is a configuration example of a communication system according to a seventh example embodiment.

FIG. 28 is a configuration example of a communication system according to the seventh example embodiment. As exemplified in FIG. 28, the communication system according to the seventh example embodiment includes an MTC-interworking function (MTC-IWF) 70 and the service capability server (SCS) 80. In the communication system according to the seventh example embodiment, other network nodes such as an S-GW 40 have configurations similar to those of the network nodes, such as the S-GW 40, according to the first example embodiment illustrated in FIG. 2, and therefore detailed description thereof is omitted. Further, a configuration example of the base station 20 according to the seventh example embodiment is similar to that of the base station 20 according to the first example embodiment illustrated in FIG. 5, and therefore detailed description thereof is omitted.

The 3GPP specifications (TS23.682 v12.0.0) describe that, for example, the MTC-IWF 70 has a function (C-plane function) of processing control signaling received from the SCS 80 and a function of securely connecting the SCS 80 to a mobile network. For example, the MTC-IWF 70 has a function of authenticating control signaling in coordination with an HSS, a function of converting control signaling in such a way to activate a suitable function in the mobile network, and a function of generating information for charging depending on use status of an MTC service.

For example, the SCS 80 has a function (C-plane function) of connecting the mobile network to a server hosting one or more MTC applications and processing control signaling in order to enable an MTC application to communicate with a UE, and a function (user plane function) of performing data communication. For example, the SCS 80 has a function of transmitting control signaling (Device Trigger Request) for activating an MTC device. For example, the SCS 80 may provide an application programming interface (API) in order to make a service provided by the mobile network readily available to an MTC service.

The SCS 80 according to the seventh example embodiment has a function of calculating a time by which the terminal 10 delays transmission of a control signal and a function of notifying the calculated delay time (delay control parameter) of the terminal 10 to the MTC-IWF 70.

Figure 29:
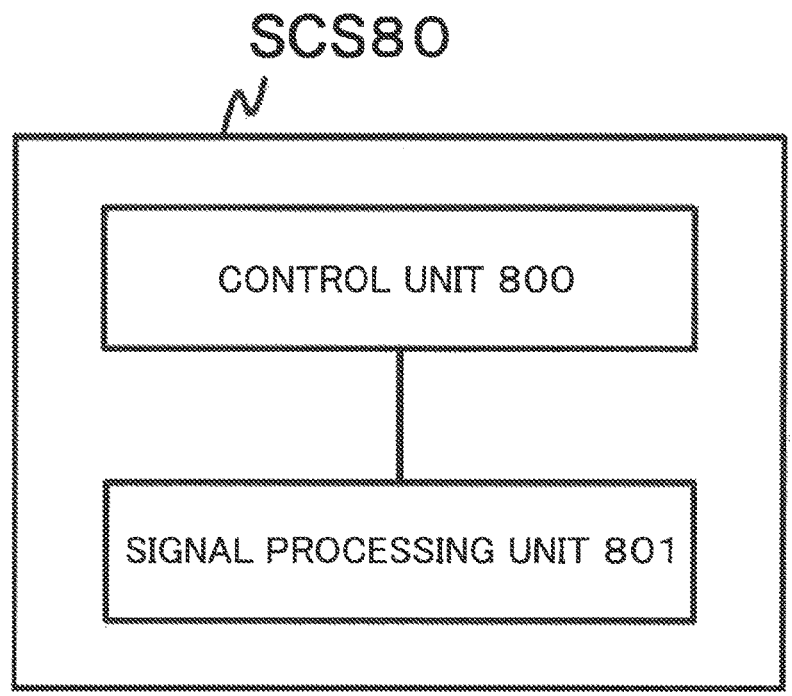
FIG. 29 is a configuration example of an SCS 80 according to the seventh example embodiment.

FIG. 29 is a diagram illustrating a configuration example of the SCS 80. As exemplified in FIG. 29, the SCS 80 includes a control unit 800 and a signal processing unit 801. For example, in response to an external request, the control unit 800 calculates a time by which the terminal 10 delays transmission of a control signal ("Service Request"). For example, out of a plurality of terminals 10, the control unit 800 specifies a group of terminals 10 that delays transmission of a control signal. For example, the control unit 800 notifies the calculated delay time (delay control parameter) of the terminal 10 and a group identifier of the specified terminal 10 to the MTC-IWF 70 through the signal processing unit 801.

In response to notifying the delay time (delay control parameter) of the terminal 10 and the group identifier of the specified terminal 10 to the MTC-IWF 70, the control unit 810 reserves transmission of a packet related to the specified terminal 10. For example, in response to notifying the delay time (delay control parameter) of the terminal 10 and the group identifier of the specified terminal 10, the control unit 810 reserves transmission of a packet related to the specified terminal 10 until receiving a predetermined notification. For example, in response to notifying the delay time (delay control parameter) of the terminal 10 and the group identifier of the specified terminal 10, the control unit 810 reserves transmission of a packet related to the specified terminal 10 until receiving a notification to the effect that bearer setting of the specified terminal 10 is completed.

For example, in response to notifying the delay time (delay control parameter) of the terminal 10 and the group identifier of the specified terminal 10, the control unit 810 stores a packet related to the specified terminal 10 into a predetermined storage unit. In response to receiving a notification to the effect that bearer setting related to the specified terminal 10 is completed, the control unit 810 starts transmission of the packet related to the specified terminal 10, the packet being stored in the predetermined storage unit. For example, the predetermined storage unit may be a memory or the like temporarily storing a packet, or may be a hard disk or the like capable of storing a packet for a predetermined time period.

In response to being notified of an IP address of a terminal 10 bearer setting of which is completed, from the MTC-IWF 70, the control unit 810 starts transmission of a packet related to the terminal 10 bearer setting of which is completed. For example, the control unit 810 transmits a packet related to the terminal 10 to the notified IP address of the terminal 10. For example, the control unit 810 transfers a packet related to the terminal 10 through the signal processing unit 811.

The MTC-IWF 70 according to the seventh example embodiment has a function of notifying the MME 30 of a delay time (delay control parameter) of a terminal 10 and a specified group identifier of the terminal 10 that are received from the SCS 80.

Figure 30:
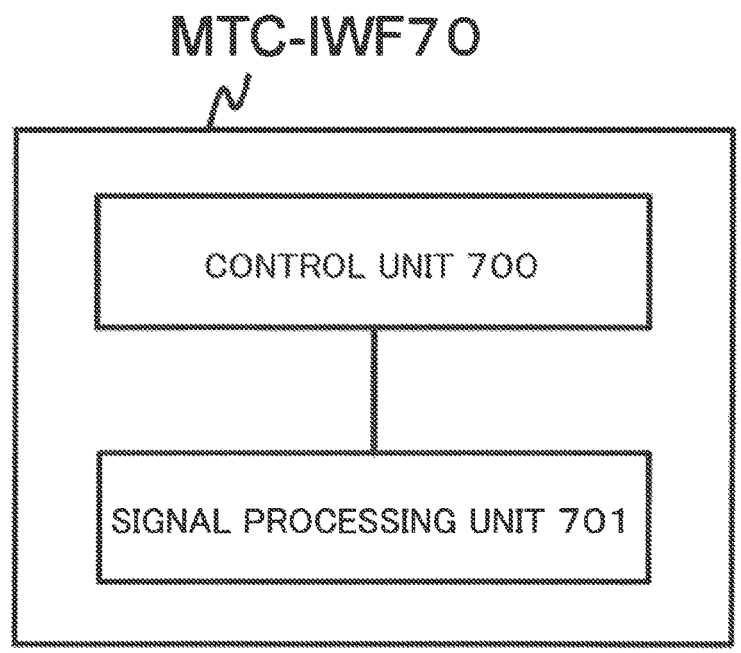
FIG. 30 is a configuration example of an MTC-IWF 70 according to the seventh example embodiment.

FIG. 30 is a diagram illustrating a configuration example of the MTC-IWF 70. As exemplified in FIG. 30, the MTC-IWF 70 includes a control unit 700 and a signal processing unit 701.

The control unit 700 authenticates a control signal on a C-plane, the signal being received from the SCS 80. Depending on the authentication result, the control unit 700 sets a delay time (delay control parameter) of a terminal 10 and a specified group identifier of the terminal 10 to a "Paging Request." The signal processing unit 701 notifies the MME 30 of the "Paging Request" to which the delay time (delay control parameter) of the terminal 10 and the specified group identifier of the terminal 10 are set.

In response to being notified of an IP address of a terminal 10 bearer setting of which is completed, from the MME 30, the control unit 710 in the MTC-IWF 70 according to the seventh example embodiment notifies the notified IP address of the terminal 10 to the SCS 80 through the signal processing unit 711.

Figure 31:
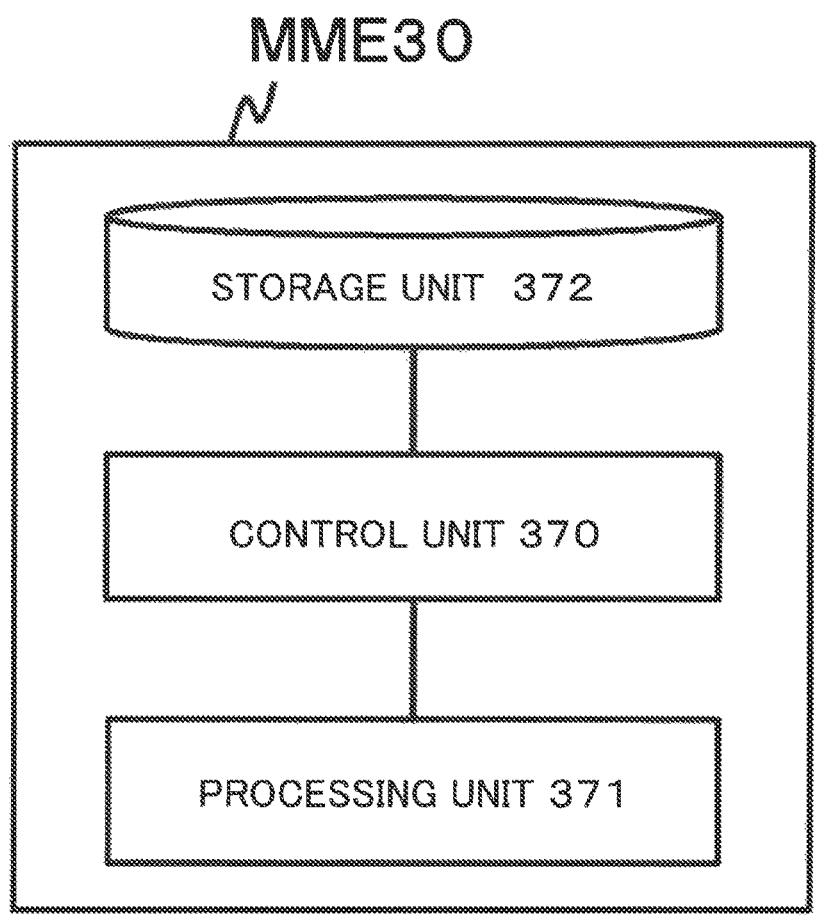
FIG. 31 is a configuration example of an MME 30 according to the seventh example embodiment.

FIG. 31 is a diagram illustrating a configuration example of the MME 30 according to the seventh example embodiment. As illustrated in FIG. 31, the MME 30 includes a control unit 370, a processing unit 371, and a storage unit 372.

The storage unit 372 stores an international mobile subscriber identity (IMSI) of a terminal 10 and an IP address of the terminal 10 in an associated manner. The IMSI is identity information of a terminal.

The control unit 370 refers to the storage unit 372 and specifies an IP address of a terminal 10 bearer setting of which is completed, from an IMSI of the terminal 10. The control unit 370 notifies the specified IP address of the terminal 10 to the MTC-IWF 70 through the processing unit 371.

The remaining function of the control unit 370 is similar to that of any one of the control units 310, 320, 330, 350, and 360 in the MME 30 according to the respective aforementioned example embodiments, and therefore detailed description thereof is omitted. Similarly, the remaining function of the processing unit 371 is similar to that of any one of the processing units 311, 321, 331, 351, and 361 in the MME 30 according to the respective aforementioned example embodiments, and therefore detailed description thereof is omitted. Additionally, the remaining function of the storage unit 372 is similar to that of any one of the storage units 332, 352, and 362 in the MME 30 according to the respective aforementioned example embodiments, and therefore detailed description thereof is omitted.

Figure 32:
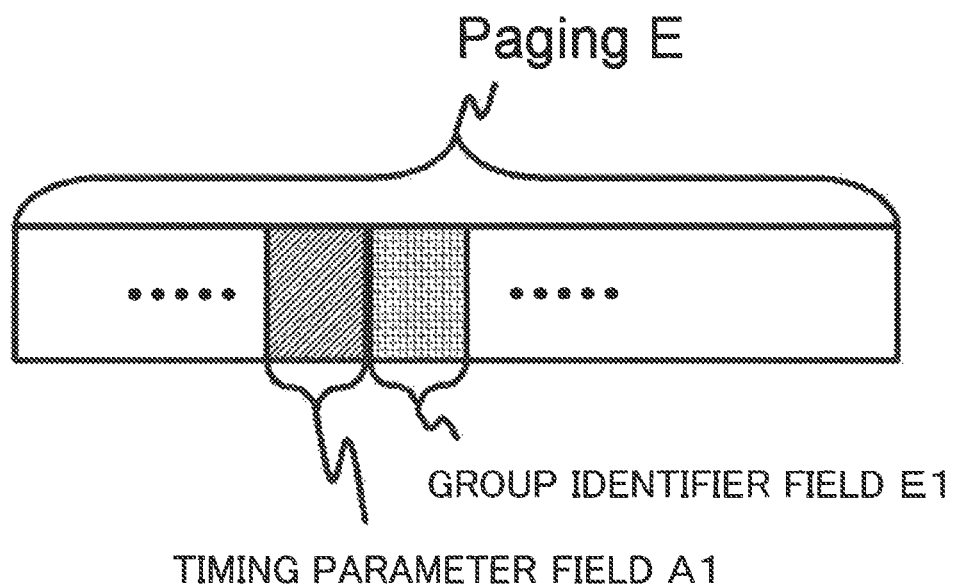
FIG. 32 is a format example of a paging message ["Paging (S1AP)"] according to the seventh example embodiment.

FIG. 32 is a configuration example of a paging message transmitted by the MME 30 according to the seventh example embodiment. As exemplified in FIG. 32, a "Paging E (S1AP)" includes a timing parameter field A1 and a group identifier field D1. The timing parameter field A1 is similar to the timing parameter field A1 according to the first example embodiment illustrated in FIG. 4, and therefore detailed description thereof is omitted. The group identifier field D1 is similar to the group identifier field D1 according to the sixth example embodiment illustrated in FIG. 24, and therefore detailed description thereof is omitted.

For example, the timing parameter field A1 and the group identifier field D1 are set in predetermined positions in the "Paging E (S1AP)" message.

For example, the positions in which the timing parameter field A1 and the group identifier field D1 are set may be a header part of the "Paging E (S1AP)" or a payload part of the "Paging E (S1AP)." The positions in which the timing parameter field A1 and the group identifier field D1 are set are not limited to the above, and may be any positions. Further, the timing parameter field A1 and the group identifier field D1 are not necessarily required to be in adjacent positions (fields) in the "Paging E (S1AP)" message, and may be in positions (fields) separated from one another. While the timing parameter field A1 and the group identifier field D1 are set in different fields in the example in FIG. 32, the fields may be set in a same field.

Figure 33:
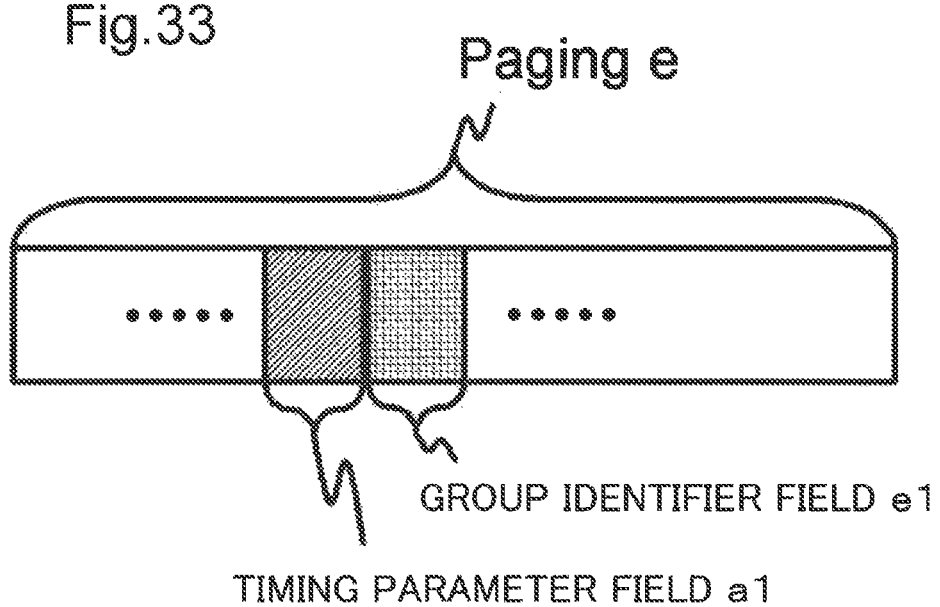
FIG. 33 is a format example of a paging message ["Paging (RRC)"] according to the seventh example embodiment.

FIG. 33 is a configuration example of a paging message transmitted by the base station 20 according to the seventh example embodiment. As exemplified in FIG. 33, a "Paging e (RRC)" may be configured to include a timing parameter field a1 and a group identifier field d1. The timing parameter field a1 is similar to the timing parameter field a1 according to the first example embodiment illustrated in FIG. 6, and therefore detailed description thereof is omitted. The group identifier field d1 is similar to the group identifier field d1 according to the sixth example embodiment illustrated in FIG. 25, and therefore detailed description thereof is omitted.

For example, the timing parameter field a1 and the group identifier field d1 are set in predetermined positions in the "Paging e (RRC)" message. For example, the positions in which the timing parameter field a1 and the group identifier field d1 are set may be a header part of the "Paging e (RRC)" or a payload part of the "Paging e (RRC)." The positions in which the timing parameter field a1 and the group identifier field d1 are set are not limited to the above, and may be any positions. Further, the timing parameter field a1 and the group identifier field d1 are not necessarily required to be in adjacent positions (fields) in the "Paging e (RRC)" message, and may be in positions (fields) separated from one another. While the timing parameter field a1 and the group identifier field d1 are set in different fields in the example in FIG. 33, the fields may be set in a same field.

Figure 34:
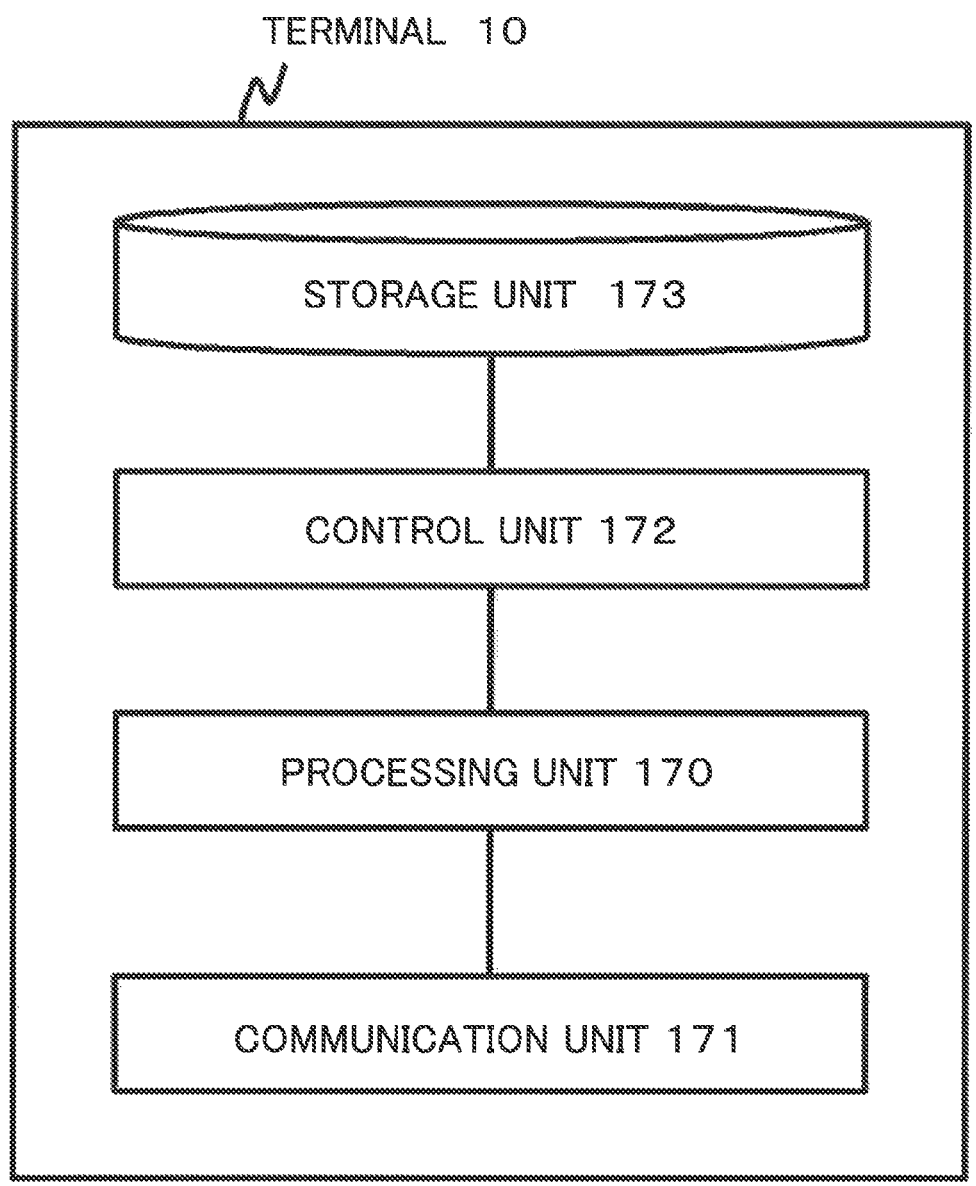
FIG. 34 is a configuration example of a terminal 10 according to the seventh example embodiment.

FIG. 34 is a configuration example of the terminal 10 according to the seventh example embodiment. As exemplified in FIG. 34, the terminal 10 includes a storage unit 173, a control unit 172, a processing unit 170, and a communication unit 171.

The communication unit 171 is similar to the communication unit 111 in the terminal 10 according to the first example embodiment exemplified in FIG. 7, and therefore detailed description thereof is omitted.

The processing unit 170 transmits a control signal ("Service Request") in response to a group specified based on information indicating a group of a terminal 10 included in a "Paging e (RRC)" received from the base station 20 matching a group to which the local terminal belongs. In this case, the processing unit 170 delays transmission of a control signal by a delay time (a time by which transmission of a control signal is delayed) determined based on information about a time (timing) related to a service class included in the "Paging e (RRC)."

Depending on whether or not a group specified as a call target, based on information included in a "Paging e (RRC)" received from the base station 20, matches a group to which the local terminal belongs, the processing unit 170 may determine whether or not to respond to the "Paging e (RRC)." For example, in response to a group specified as a call target, the group being included in a "Paging e (RRC)," matching a group of the local terminal, the processing unit 170 determines to respond to the "Paging e (RRC)."

In response to determining to respond to a "Paging e (RRC)," the control unit 172 determines a time (value) at which a control signal ("Service Request") is transmitted, based on information about a time (timing), the information being included in the "Paging e (RRC)." The processing unit 170 may determine a time (value) at which a control signal ("Service Request") is transmitted, based on information about a time (timing), the information being included in the "Paging e (RRC)."

The method of the control unit 172 or the processing unit 170 determining a time (value) at which a control signal is transmitted is similar to that by the processing unit 130 exemplified in FIG. 16 or the control unit 143 exemplified in FIG. 18, and therefore detailed description thereof is omitted.

Figure 35:
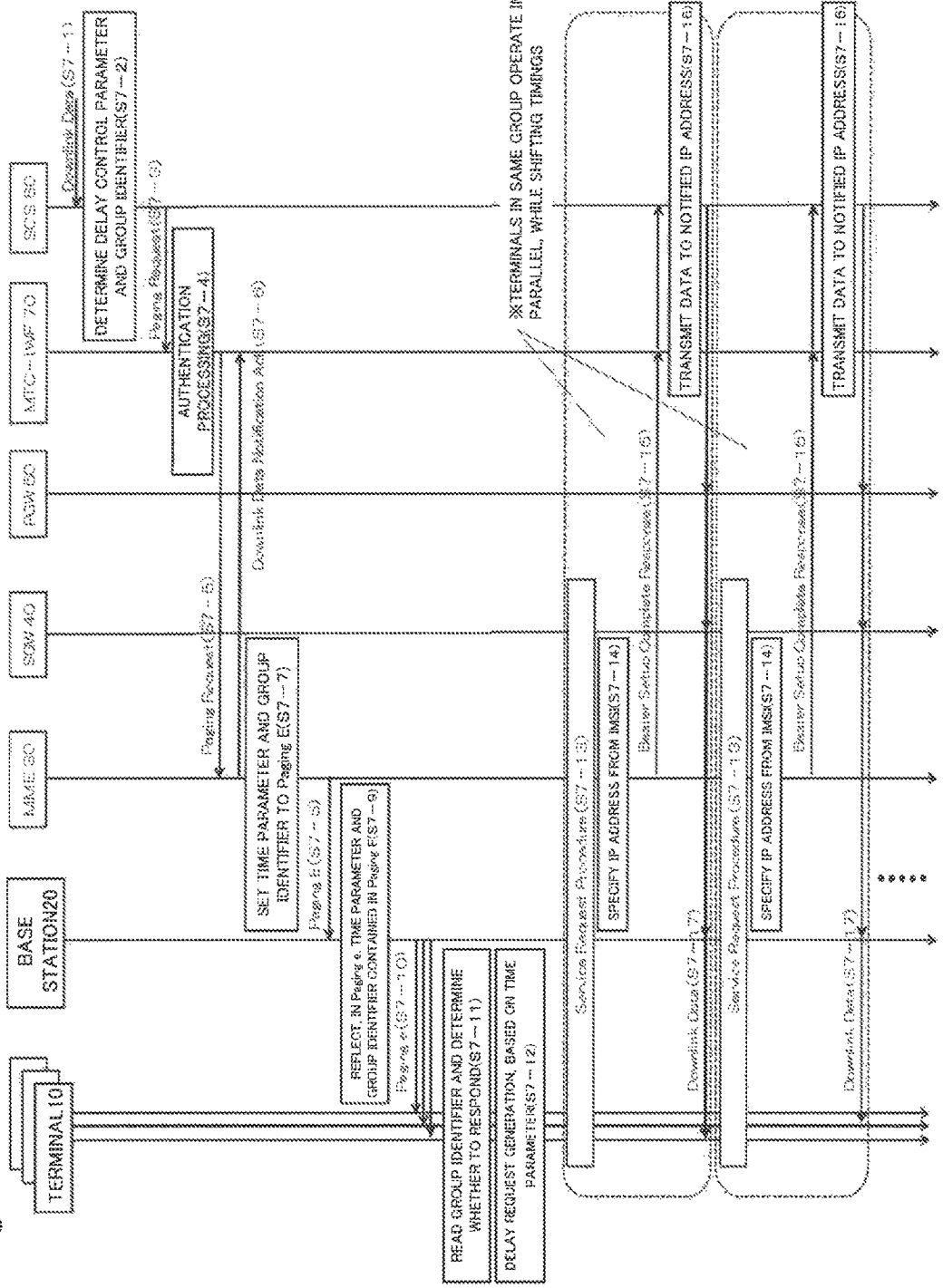
FIG. 35 is a sequence diagram illustrating an operation example of the communication system according to the seventh example embodiment.

FIG. 35 is a sequence diagram illustrating an operation example of the system according to the seventh example embodiment.

In response to receiving "Downlink Data" (S7-1), the control unit 800 in the SCS 80 determines a time (delay control parameter) by which the terminal 10 delays transmission of a control signal ("Service Request") and a group (group identifier) of the terminal 10 delaying transmission of a control signal (S7-2). For example, the "Downlink Data" according to the seventh example embodiment of the present invention may be data transmitted to a plurality of terminals 10.

The control unit 800 in the SCS 80 notifies the MTC-IWF 70 of a "Paging Request" to which the delay time (delay control parameter) of the terminal 10 and the specified group identifier of the terminal 10 are set, through the signal processing unit 801 (S7-3).

In response to receiving the "Paging Request," the control unit 700 in the MTC-IWF 70 performs predetermined authentication processing (S7-4), and, depending on the authentication result, transfers a "Paging Request" reflecting the delay time (delay control parameter) of the terminal 10 and the specified group identifier of the terminal 10 to the MME 30 (S7-5).

In response to receiving the "Paging Request," the control unit 370 in the MME returns a "Downlink Data Notification ACK" to the MTC-IWF 70 (S7-6).

In response to receiving the "Paging Request" including the delay time (delay control parameter) of the terminal 10 and the specified group identifier of the terminal 10 from the MTC-IWF 70, the control unit 370 in the MME 30 sets (reflects) the delay time (delay control parameter) of the terminal 10 and the specified group identifier of the terminal 10 to (in) a paging message (S7-7). The control unit 370 transmits a paging message "Paging E (S1AP)" including the information about the timing and the information indicating the group to which the terminal 10 belongs to the base station (S7-8).

In response to receiving the "Paging E (S1AP)," a control unit 210 in the base station 20 reflects the timing parameter field A1 and the group identifier field E1 in the "Paging E (S1AP)" to a timing parameter field a1 and a group identifier field e1 in a "Paging e (RRC)" (S7-9).

A communication unit 211 in the base station 20 transmits the "Paging e (RRC)" to the terminal 10 (S7-10). The communication unit 211 may transmit the "Paging e (RRC)" to a plurality of terminals 10.

Depending on whether or not a group specified as a call target, the group being included in the "Paging e (RRC)" received from the base station 20, matches a group of the local terminal, the processing unit 170 in the terminal 10 determines whether or not to respond to the "Paging e (RRC)" (S7-11).

In response to determining to respond to the "Paging e (RRC)," the processing unit 170 determines a time (value) at which a control signal ("Service Request") is transmitted, based on information about the timing included in the "Paging e (RRC)," and delays transmission of a control signal by the determined time ("delay request generation" in S7-12).

In S7-11 and S7-12, a plurality of terminals 10 belonging to a group specified from the information included in the "Paging e (RRC)" respond to the "Paging e (RRC)" and transmit control signals ("Service Requests").

In response to completion of bearer setting of a predetermined terminal 10 ("Service Request Procedure" in S7-13), the control unit 370 in the MME 30 specifies an IP address of the predetermined terminal 10 from an IMSI of the terminal 10 (S7-14). For example, the control unit 370 refers to the storage unit 372 and specifies an IP address of the terminal 10 from an IMSI of the terminal 10 bearer setting of which is completed.

The control unit 370 notifies the specified IP address to the MTC-IWF 70 through the processing unit 371 ("Bearer Setup Complete Response" in S7-15). The MTC-IWF 70 transfers the notified IP address of the terminal 10 to the SCS 80 (S7-15).

The control unit 810 in the SCS 80 transmits a packet related to the notified terminal 10 to the IP address of the terminal 10 (S7-16). Consequently, communication data are transferred to the predetermined terminal 10 ("Downlink Data" in S7-17). In this case, since bearer setting of the predetermined terminal 10 is completed, the S-GW 40 transfers the communication data to the predetermined terminal 10, without requesting the MME 30 to transmit a paging message.

According to the seventh example embodiment, transmission timings of control signals (Service Requests) from a plurality of terminals 10 are dispersed, and completion timings of bearer setting in the plurality of terminals 10 are consequently dispersed. Accordingly, as illustrated in FIG. 35, S7-13 to S7-17 are performed in a dispersed manner for each terminal 10 in a same group.

Figure 36:
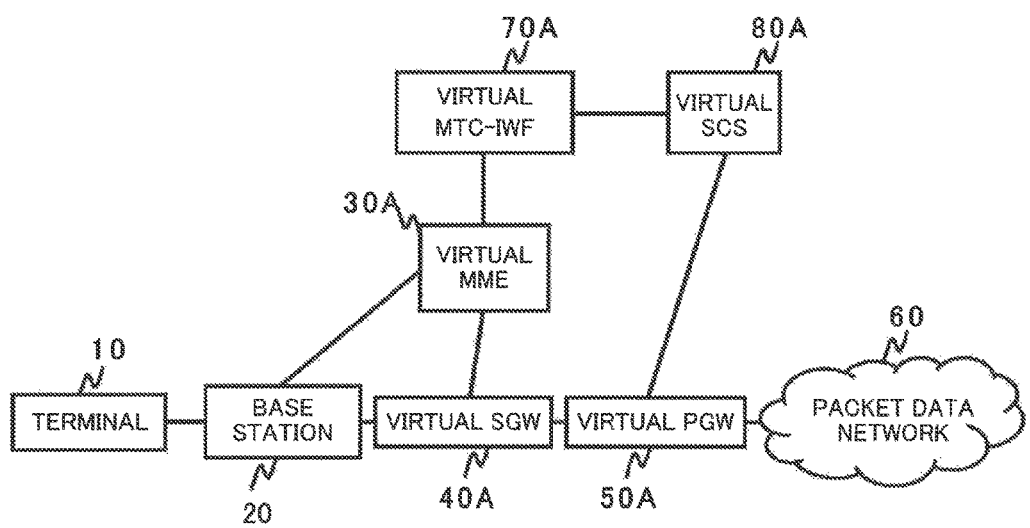
FIG. 36 is another configuration example of the communication system according to the seventh example embodiment.

As illustrated in FIG. 36, the functions of the network nodes (the MME 30, the SGW 40, and a PGW 50), the MTC-IWF 70, and the SCS 80 in the system according to the seventh example embodiment may be run on virtual machines.

FIG. 36 is another configuration example of the system according to the seventh example embodiment. As illustrated in FIG. 36, the system according to the seventh example embodiment includes the terminal 10, the base station 20, virtual network nodes (a virtual MME 30A, a virtual SGW 40A, and a virtual PGW 50), a virtual MTC-IWF 70A, and a virtual SCS 80A. Functions of the respective virtual network nodes (the virtual MME 30A, the virtual SGW 40A, and the virtual PGW 50), the virtual MTC-IWF 70A, and the virtual SCS 80A are similar to those of the network nodes (the MME 30A, the SGW 40A, and the PGW 50), the MTC-IWF 70A, and the SCS 80A that are illustrated in FIG. 28, and therefore detailed description thereof is omitted.

Figure 37:
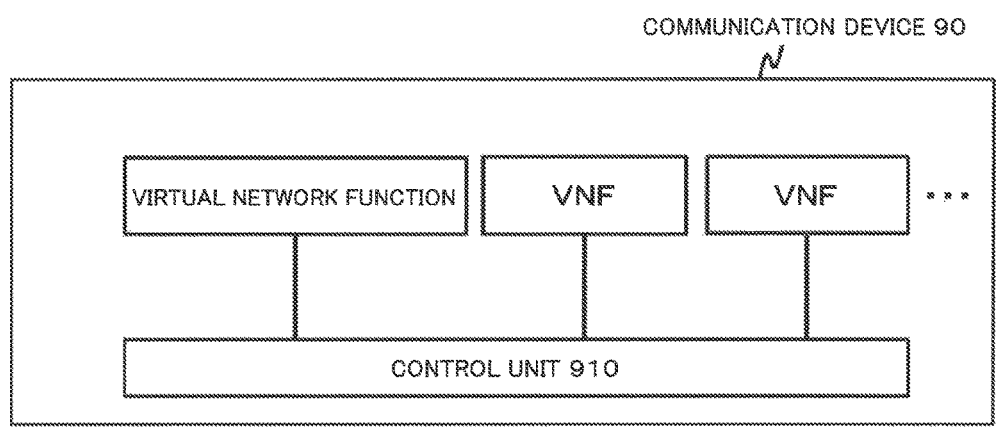
FIG. 37 is a configuration example of a communication device 90 according to the seventh example embodiment.

FIG. 37 is a diagram illustrating a communication device 90 that is able to run a virtual machine providing the functions of the network nodes (the MME 30, the SGW 40, and the PGW 50), the MTC-IWF 70, and the SCS 80 in the system according to the seventh example embodiment.

For example, the communication device 90 is a server, a switch, or a router. The communication device 90 runs a virtual machine providing functions of virtual network nodes (e.g. a virtual SGW, a virtual PGW, and a virtual MME) in a virtual network.

The communication device 90 includes a control unit 910 that is able to construct a virtual network function (VNF) 220. The control unit 910 provides a function of a virtual network node by running a VNF on a virtual machine. For example, such a control unit 910 may be composed of a control program such as a hypervisor that is able to perform computer virtualization.

As described above, according to the seventh example embodiment, when a paging message to which information indicating a group to which a terminal belongs is set is transmitted to a predetermined terminal, the SCS 80 holds a packet on a user plane, the packet being related to the predetermined terminal, until a transmission timing. Accordingly, in a case such as simultaneously distributing information to a plurality of terminals, by providing the SCS 80 to adjust a timing and perform distribution to the plurality of terminals 10, the S-GW 40 does not concentratedly request the MME 30 to transmit paging messages, and therefore load increase on the MME 30 can be suppressed.

Eighth Example Embodiment

An eighth example embodiment of the present invention is an example embodiment in a case that an MME includes an "instruction to store predetermined information in a control signal (RRC Connection Request)" in a paging message transmitted to a terminal, in accordance with a predetermined policy. The technology according to the eighth example embodiment is applicable to the respective first to seventh example embodiments. A configuration example of a base station 20 according to the eighth example embodiment is similar to that of the base station 20 according to the first example embodiment illustrated in FIG. 5, and therefore detailed description thereof is omitted.

When an "instruction to store predetermined information in a control signal (RRC Connection Request)" is included in a received paging message, a terminal 10 stores the predetermined information in a transmitted control signal.

For example, the predetermined information is information indicating priority of a terminal. For example, the predetermined information is a low access priority indicator (LAPI). For example, the predetermined information is a delayTolerantAccess flag.

In a communication system according to the eighth example embodiment, in response to a control signal (RRC Connection Request) received from a terminal 10 storing predetermined information, the base station 20 lowers priority of transfer of a control signal (Service Request) transmitted by the terminal 10 to an MME 30. For example, in response to a control signal (RRC Connection Request) received from a terminal 10 storing a delayTolerantAccess flag, the base station 20 discards the control signal. When the control signal is discarded, the terminal 10 becomes unable to transmit a control signal (Service Request). Accordingly, the MME 30 in the communication system according to the eighth example embodiment is able to decrease a reception frequency of control signals (Service Requests) from the terminal 10, and therefore is able to suppress load increase on the MME 30.

The communication system according to the eighth example embodiment is similar to the communication system according to the first example embodiment exemplified in FIG. 2, and therefore detailed description thereof is omitted.

Figure 38:
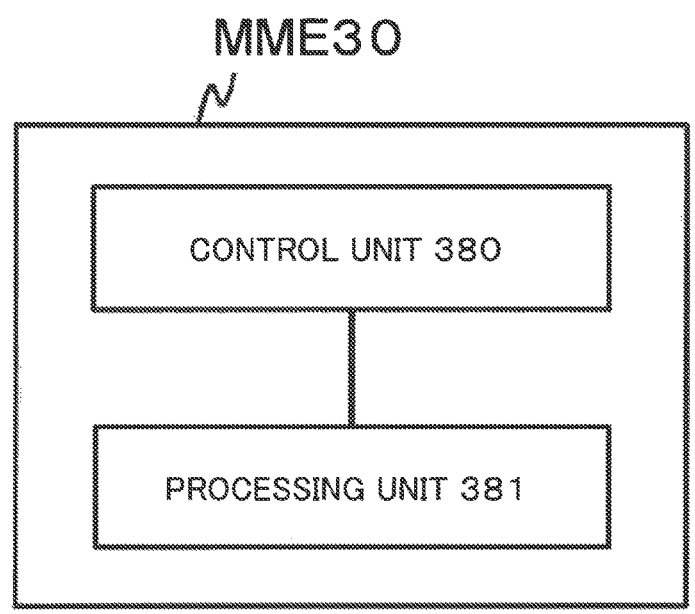
FIG. 38 is a configuration example of an MME 30 according to an eighth example embodiment.

FIG. 38 is a configuration example of the MME 30 according to the eighth example embodiment. As exemplified in FIG. 38, the MME 30 includes a control unit 380 and a processing unit 381. The processing unit 381 has a configuration similar to that of the processing unit 301 illustrated in FIG. 3, and therefore detailed description thereof is omitted.

The control unit 380 has a function of including an instruction to store predetermined information in a control signal (RRC Connection Request) transmitted by a terminal in a predetermined field in a paging message transmitted to the terminal, in accordance with a predetermined policy.

For example, the control unit 380 includes an "instruction to store information indicating priority of a terminal in a control signal transmitted by the terminal" in a paging message transmitted to the terminal, in accordance with a predetermined policy. For example, the control unit 380 includes an "instruction to store a low access priority indicator (LAPI) in a control signal" in a paging message transmitted to the terminal, in accordance with a predetermined policy. For example, the control unit 360 includes an "instruction to store a delayTolerantAccess flag in a control signal" in a paging message transmitted to the terminal, in accordance with a predetermined policy.

Further, in response to an attribute of a terminal being a predetermined attribute, the control unit 380 includes an "instruction to store predetermined information in a control signal (RRC Connection Request) transmitted by the terminal" in a paging message transmitted to the terminal. For example, in response to a terminal being an MTC device, the control unit 380 includes an "instruction to store predetermined information in a control signal (RRC Connection Request) transmitted by the terminal" in a paging message transmitted to the terminal. Depending on congestion status of the entire network or load status of the MME, the control unit 380 includes an "instruction to store predetermined information in a control signal (RRC Connection Request) transmitted by the terminal" in a paging message transmitted to the terminal.

The remaining functions of the control unit 380 and the processing unit 381 are similar to those of the MME 30 according to the first example embodiment exemplified in FIG. 3, and therefore detailed description thereof is omitted.

Figure 39:
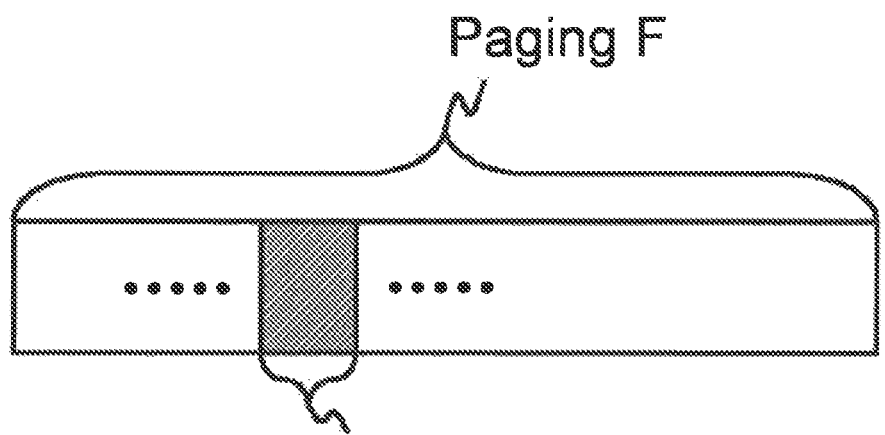
FIG. 39 is a format example of a paging message ["Paging (S1AP)"] according to the eighth example embodiment.

FIG. 39 illustrates a format example of a paging packet ["Paging F (S1AP)"] according to the eighth example embodiment. As exemplified in FIG. 39, the "Paging F (S1AP)" includes a terminal attribute field F1. The terminal attribute field F1 is a field for including an "instruction to store predetermined information in a control signal (RRC Connection Request) transmitted by the terminal 10." For example, the terminal attribute field F1 includes an "instruction to store a delayTolerantAccess flag in a control signal (RRC Connection Request)."

For example, the terminal attribute field F1 is set in a predetermined position in the "Paging F (S1AP)" message. For example, the position in which the terminal attribute field F1 is set may be a header part of the "Paging F" or a payload part of the "Paging F." The position in which the terminal attribute field F1 is set is not limited to the above, and may be any position.

Figure 40:
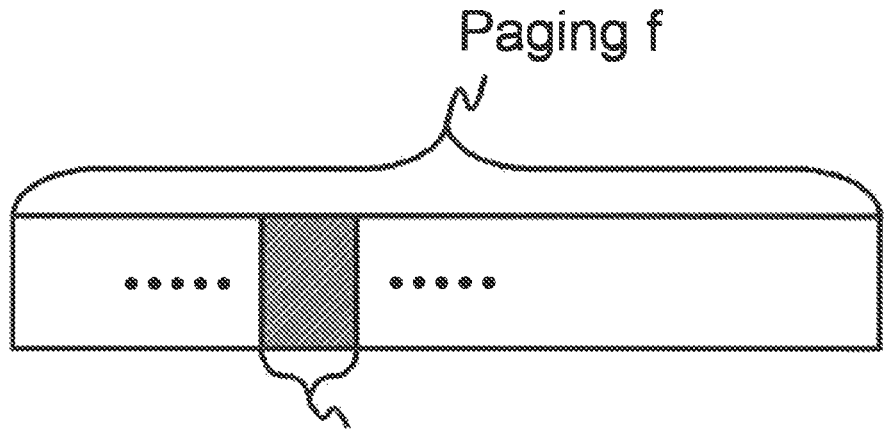
FIG. 40 is a format example of a paging message ["Paging (RRC)"] according to the eighth example embodiment.

FIG. 40 illustrates a format example of a paging packet ["Paging f (RRC)"]. As illustrated in FIG. 40, the "Paging f (RRC)" includes a terminal attribute field f1. The terminal attribute field f1 is a field for a control unit 210 in the base station 20 to include an "instruction to store predetermined information in a control signal transmitted by a terminal 10," based on a terminal attribute field F1 included in a paging message ["Paging F (S1AP)"] received from the MME 30. For example, the terminal attribute field f1 includes an "instruction to store a delayTolerantAccess flag in a control signal (RRC Connection Request)."

Figure 41:
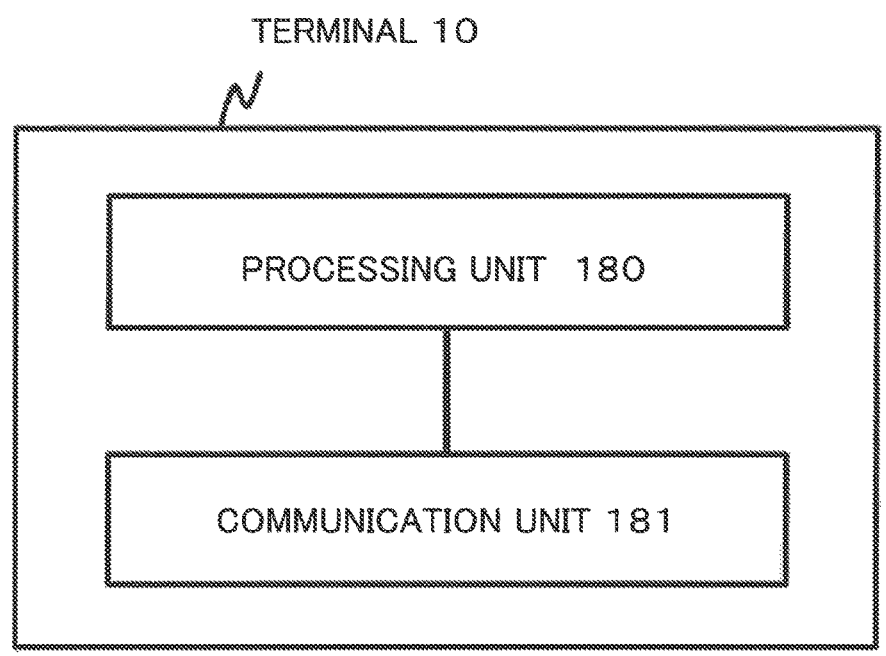
FIG. 41 is a configuration example of a terminal 10 according to the eighth example embodiment.

FIG. 41 is a configuration example of the terminal 10 according to the eighth example embodiment. As exemplified in FIG. 41, the terminal 10 includes a control unit 180 and a communication unit 181. The communication unit 181 has a configuration similar to that of the communication unit 101 according to the first example embodiment illustrated in FIG. 3, and therefore detailed description thereof is omitted.

In response to a "Paging f (RRC)" including an instruction to store predetermined information in a control signal (RRC Connection Request) transmitted by a terminal 10, the control unit 180 stores the predetermined information in the control signal. For example, in response to a "Paging f (RRC)" including an "instruction to store a delayTolerantAccess flag in a control signal," the control unit 180 stores a delayTolerantAccess flag in a control signal (RRC Connection Request).

FIG. 42 illustrates an operation example of the communication system according to the eighth example embodiment. S8-1 to S8-3 in FIG. 42 are similar to S1-1 to S1-3 in the operation example according to the first example embodiment illustrated in FIG. 8, and therefore detailed description thereof is omitted.

The control unit 380 in the MME 30 sets an instruction to store predetermined information in a control signal (RRC Connection Request) to a terminal attribute field F1 in a "Paging F (S1AP)" (S8-4). For example, the control unit 360 includes an instruction to store a delayTolerantAccess flag in a control signal (RRC Connection Request) in a terminal attribute field F1 in a "Paging F (S1AP)."

The control unit 380 in the MME transmits the paging message "Paging F (S1AP)" to the base station 20 through the processing unit 381 (S8-5).

In response to receiving the "Paging F (S1AP)," the control unit 210 in the base station 20 reflects the terminal attribute field F1 in the "Paging F (S1AP)" to a terminal attribute field f1 in a "Paging f (RRC)" (S8-6). For example, the control unit 210 includes an instruction to store a delayTolerantAccess flag in a control signal (RRC Connection Request) in a terminal attribute field f1 in a "Paging F (S1AP)."

The communication unit 211 in the base station 20 transmits the "Paging f (RRC)" to the terminal 10 (S8-7). The communication unit 211 may transmit the "Paging f" to a plurality of terminals 10.

In response to the "Paging f (RRC)" including an instruction to store predetermined information in a control signal (RRC Connection Request) transmitted by the terminal 10, the control unit 180 in the terminal 10 stores the predetermined information in the control signal (S8-8). For example, in response to the "Paging f (RRC)" including an instruction requesting storage of a delayTolerantAccess flag, the control unit 180 stores a delayTolerantAccess flag in a control signal (RRC Connection Request).

In response to the control signal received from the terminal including predetermined information, the control unit 210 in the base station performs processing for lowering priority of transfer of the control signal (S8-9). For example, in response to the control signal received from the terminal 10 including predetermined information, the control unit 210 discards the control signal.

As described above, in the communication system according to the eighth example embodiment, the MME 30 includes an "instruction to store predetermined information in a control signal (RRC Connection Request)" in a paging message transmitted to the terminal 10, in accordance with a predetermined policy. Then, when a received paging message includes an "instruction to store predetermined information in a control signal (RRC Connection Request)," the terminal 10 stores the predetermined information in a transmitted control signal. Accordingly, when discarding a control signal in response to the control signal received from the terminal 10 storing the predetermined information, the base station 20 is able to lower priority of transfer of control signals (Service Requests) to the MME 30. Accordingly, the MME 30 is able to decrease a reception frequency of control signals (Service Requests) from the terminal 10, and suppress load increase on the MME 30.

While the example embodiments of the present invention have been described above, the present invention is not limited to the respective aforementioned example embodiments. The present invention may be implemented based on modification of, substitution of, and/or adjustment to the respective example embodiments.

Further, the present invention may be implemented in any combination of the respective example embodiments. In other words, the present invention includes various modifications and changes that may be made based on the entire disclosure of the description, and the technological concept.

Further, the present invention is also applicable to a technical field of a software-defined network (SDN).

Further, in the present invention, computers, central processing units (CPUs), micro-processing units (MPUs), or the like on the terminal 10, the base station (eNB) 20, the network nodes (the S-GW 30, the P-GW 40, and the MME50), the MTC-IWF 70, and the SCS 80 may execute software (program) providing the functions of the respective aforementioned example embodiments. A terminal 10 or each network node may acquire software (program) providing the functions of the respective aforementioned example embodiments through computer-readable non-transitory storage media, various types of storage media such as a compact disc recordable (CD-R), or a network. The program acquired by the terminal 10 or the each network node, and a computer-readable non-transitory storage medium storing the program constitute the present invention. For example, the software (program) may be pre-stored in a predetermined storage unit included in the terminal 10 or the each network node. A computer, a CPU, an MPU, or the like on the terminal 10 or the each network node may read and execute a program code of the acquired software (program). Accordingly, the terminal 10 or the each network node performs same processing as the processing performed by the terminal 10, the base station (eNB) 20, the network nodes (the S-GW 30, the P-GW 40, and the MME50), the MTC-IWF 70, and the SCS 80, according to the respective aforementioned example embodiments.

REFERENCE SIGNS LIST

10 Terminal
20 Base station
30 MME
30A Virtual MME
40 S-GW
40A Virtual S-GW
50 P-GW
50A Virtual P-GW
60 Packet data network
70 MTC-IWF
70A Virtual MTC-IWF
80 SCS
80A Virtual SCS
90 Communication device
110, 130, 140, 150, 160, 170, 180 Processing unit
111, 131, 141, 151, 161, 171, 181 Communication unit
132, 142, 152, 162, 172 Storage unit
143, 153, 163, 173 Control unit
210 Control unit
211 Processing unit
310, 320, 330, 350, 360, 370, 380 Control unit
311, 321, 331, 351, 361, 371, 381 Processing unit
332, 352, 362, 372 Storage unit
700 Control unit
701 Signal processing unit
800 Control unit
801 Signal processing unit
910 Control unit

The invention claimed is:

1. A communication device transmitting a paging message to a terminal that, in response to receiving the paging message, transmits a control signal for connecting to a network, the communication device comprising:
- a controller that, in response to being requested to transmit the paging message to a plurality of terminals, determines a time by which transmission of the control signal is delayed, for each of the plurality of terminals; and
- a transmitter that transmits the paging message including an instruction to store predetermined information in the control signal, to each of the plurality of terminals,
- wherein the controller randomly determines the time by which transmission of the control signal is delayed, from a time range determined by an upper limit and a lower limit of the time by which transmission of the control signal is delayed, for each of the plurality of terminals.

2. The communication device according to claim 1, wherein
the controller randomly determines the time by which transmission of the control signal is delayed, from predetermined candidates or a predetermined time range, for each of the plurality of terminals.

3. The communication device according to claim 1, wherein
the controller determines the time by which transmission of the control signal is delayed, in response to being requested to transmit the paging message to a plurality of terminals belonging to a predetermined type, for each of a plurality of terminals belonging to the predetermined type.

4. The communication device according to claim 1, wherein
the terminal is a machine type communication (MTC) device, and
the controller determines the time by which transmission of the control signal is delayed, in response to being requested to transmit the paging message to a plurality of MTC devices, for each of the plurality of MTC devices.

5. A communication system comprising:
- a plurality of terminals transmitting a control signal for connecting to a network, in response to receiving a paging message; and
- a communication device that, in response to being requested to transmit the paging message to the plurality of terminals, is able to transmit, to each of the plurality of terminals, the paging message including an instruction to store predetermined information in the control signal, wherein
- the communication device determines the time by which transmission of the control signal is delayed, for each of the plurality of terminals, wherein the communication device randomly determines the time by which transmission of the control signal is delayed, from a time range determined by an upper limit and a lower limit of the time by which transmission of the control signal is delayed, for each of the plurality of terminals.

6. The communication system according to claim 5, wherein
the communication device randomly determines the time by which transmission of the control signal is delayed, from predetermined candidates or a predetermined time range, for each of the plurality of terminals.

7. The communication system according to claim 5, wherein,
in response to being requested to transmit the paging message to a plurality of terminals belonging to a predetermined type, the communication device transmits the paging message to each of the plurality of terminals belonging to the predetermined type.

8. The communication system according to claim 5, wherein
the terminal is a machine type communication (MTC) device, and,
in response to being requested to transmit the paging message to a plurality of MTC devices, the communication device transmits the paging message to each of the plurality of MTC devices.

9. A communication method in a communication device transmitting a paging message to a terminal that, in response to receiving the paging message, transmits a control signal for connecting to a network, the communication method comprising:
- determining a time by which transmission of the control signal is delayed, in response to being requested to transmit the paging message to a plurality of terminals, for each of the terminals; and
- transmitting the paging message including an instruction to store predetermined information in the control signal, to each of the plurality of terminals, wherein, in the determining, the time by which transmission of the control signal is delayed is randomly determined from a time range determined by an upper limit and a lower limit of the time by which transmission of the control signal is delayed, for each of the plurality of terminals.

10. The communication method according to claim 9, wherein,
in the determining, the time by which transmission of the control signal is delayed is randomly determined from predetermined candidates or a predetermined time range, for each of the plurality of terminals.

11. The communication method according to claim 9, wherein,
in the determining, in response to being requested to transmit the paging message to a plurality of terminals belonging to a predetermined type, the time by which transmission of the control signal is delayed is determined for each of the plurality of terminals belonging to the predetermined type.

12. The communication method according to claim 9, wherein,
in the determining,
the terminal is a machine type communication (MTC) device, and,
in response to being requested to transmit the paging message to a plurality of MTC devices, the time by which transmission of the control signal is delayed is determined for each of the plurality of MTC devices.

* * * * *

UNITED STATES PATENT AND TRADEMARK OFFICE
CERTIFICATE OF CORRECTION

PATENT NO. : 10,470,158 B2
APPLICATION NO. : 15/563024
DATED : November 5, 2019
INVENTOR(S) : Yoshiyuki Yamada It is certified that error appears in the above-identified patent and that said Letters Patent is hereby corrected as shown below:

In the Specification

Column 14, Description of Embodiments, Line 7; After "station", insert --20--

Signed and Sealed this
Twenty-fourth Day of November, 2020

Andrei Iancu
*Director of the United States Patent and Trademark Office*